United States Patent
Rom et al.

(10) Patent No.: US 10,959,293 B2
(45) Date of Patent: Mar. 23, 2021

(54) APPARATUS, SYSTEM AND METHOD OF ACTIVE SCANNING

(71) Applicant: INTEL CORPORATION, Santa Clara, CA (US)

(72) Inventors: Leor Rom, Haifa (IL); Ido Ouzieli, Tel Aviv (IL); Noam Ginsburg, Haifa (IL); Ofer Hareuveni, Haifa (IL); Oren Kaidar, Binyamina (IL)

(73) Assignee: INTEL CORPORATION, Santa Clara, CA (US)

( * ) Notice: Subject to any disclaimer, the term of this patent is extended or adjusted under 35 U.S.C. 154(b) by 56 days.

(21) Appl. No.: 16/367,903

(22) Filed: Mar. 28, 2019

(65) Prior Publication Data
US 2020/0045772 A1 Feb. 6, 2020

(51) Int. Cl.
*H04W 88/08* (2009.01)
*H04W 28/02* (2009.01)
*H04B 17/318* (2015.01)

(52) U.S. Cl.
CPC ......... *H04W 88/08* (2013.01); *H04B 17/318* (2015.01); *H04W 28/0236* (2013.01); *H04W 28/0257* (2013.01)

(58) Field of Classification Search
None
See application file for complete search history.

(56) References Cited

U.S. PATENT DOCUMENTS

| | | | |
|---|---|---|---|
| 2010/0173586 A1* | 7/2010 | McHenry | H04L 27/0006 455/62 |
| 2011/0256863 A1* | 10/2011 | Ramasamy | H04W 24/08 455/424 |
| 2015/0341753 A1* | 11/2015 | Chen | H04B 17/318 455/456.1 |
| 2017/0055254 A1* | 2/2017 | HomChaudhuri | H04W 24/08 |
| 2017/0064618 A1* | 3/2017 | Katar | H04W 8/02 |
| 2018/0063851 A1* | 3/2018 | Abraham | H04W 72/06 |
| 2019/0021093 A1* | 1/2019 | Anderson | H04W 72/085 |

OTHER PUBLICATIONS

IEEE Std 80211™-2016. IEEE Standard for Information technology—Telecommunications and information exchange between systems Local and metropolitan area networks—Specific requirements Part 11: Wireless LAN Medium Access Control (MAC) and Physical Layer (PHY) Specifications, Dec. 7, 2016, 3534 pages.

* cited by examiner

*Primary Examiner* — Lonnie V Sweet
(74) *Attorney, Agent, or Firm* — Shichrur & Co.

(57) ABSTRACT

For example, an apparatus may include logic and circuitry configured to cause a wireless communication device to maintain active scan configuration information defining a plurality of active scan configurations corresponding to a respective plurality of predefined environment types; to classify a wireless communication channel as a selected environment type from the plurality of predefined environment types based on scan results of at least one first active scan over the wireless communication channel; and to perform at least one second active scan over the wireless communication channel according to a selected active scan configuration corresponding to the selected environment type.

25 Claims, 8 Drawing Sheets

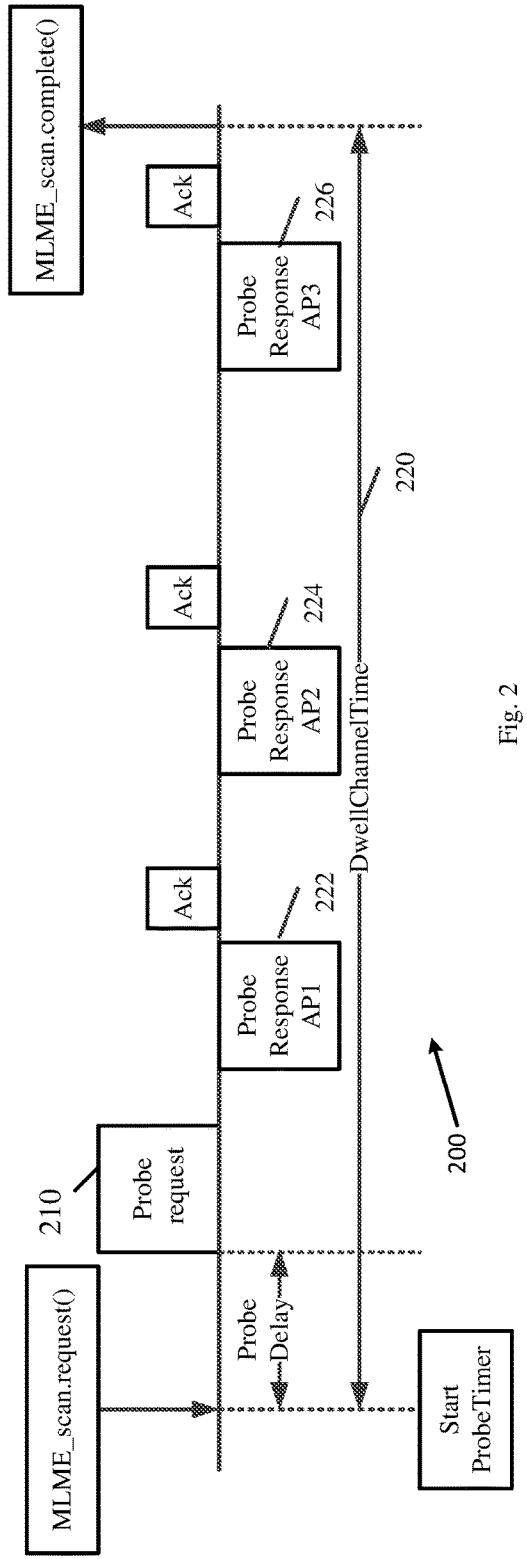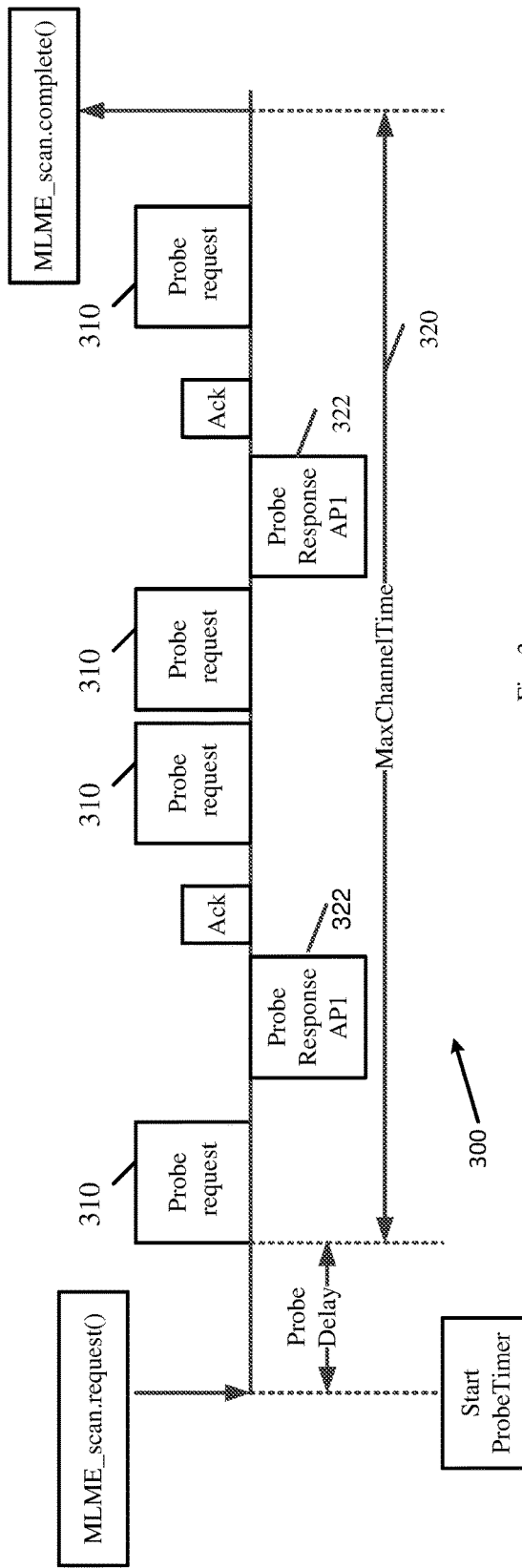

APPARATUS, SYSTEM AND METHOD OF ACTIVE SCANNING

TECHNICAL FIELD

Embodiments described herein generally relate to active scanning.

BACKGROUND

An active scan may be performed by a wireless communication station (STA), for example, to find one or more Access Points (APs).

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

FIG. 2 is a schematic illustration of an active scan, which may be implemented in accordance with some demonstrative embodiments.

FIG. 3 is a schematic illustration of an active scan, which may be implemented in accordance with some demonstrative embodiments.

DETAILED DESCRIPTION

Figure 1:
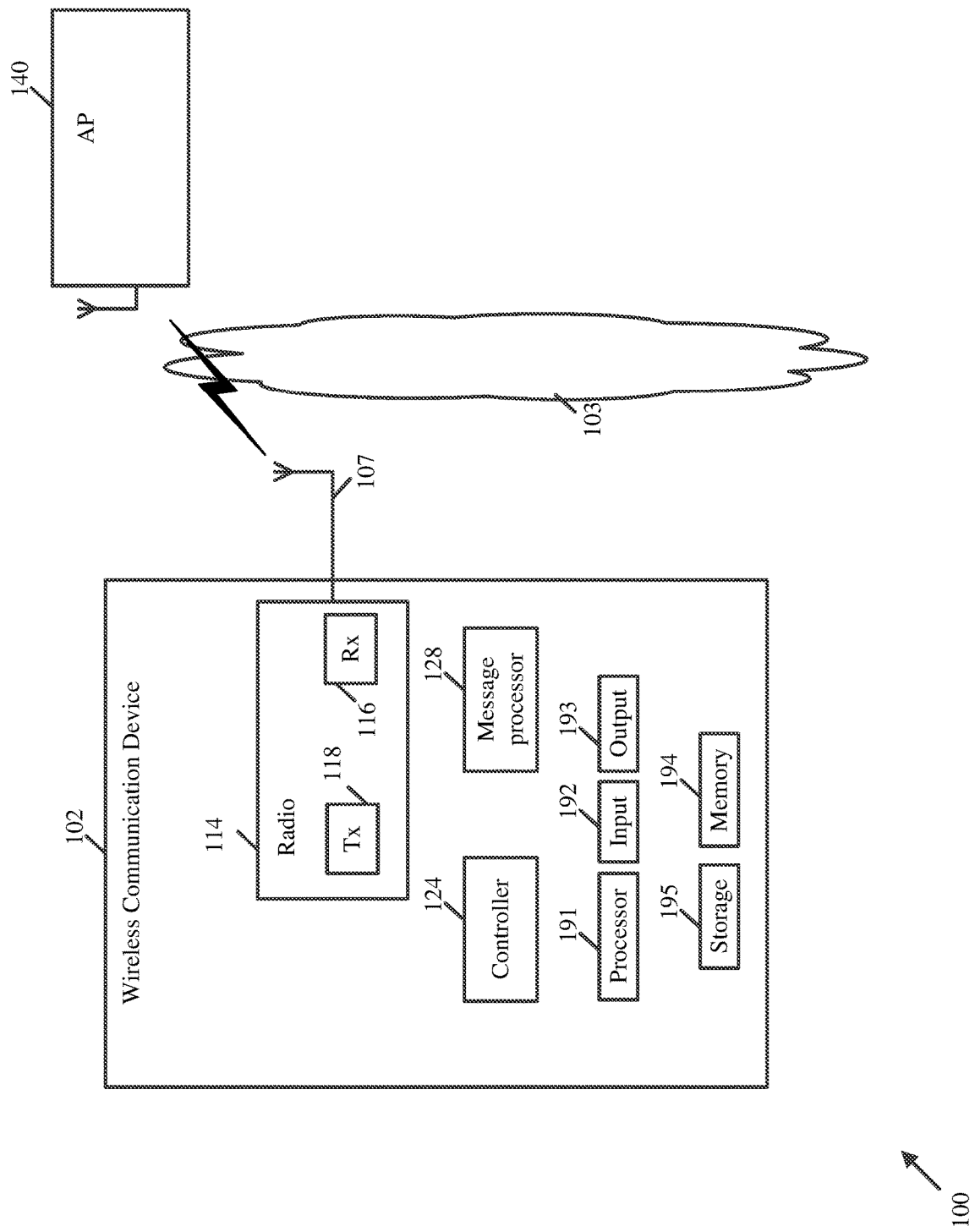
FIG. 1 is a schematic block diagram illustration of a system, in accordance with some demonstrative embodiments.

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality", as used herein, include, for example, "multiple" or "two or more". For example, "a plurality of items" includes two or more items.

References to "one embodiment", "an embodiment", "demonstrative embodiment", "various embodiments" etc., indicate that the embodiment(s) so described may include a particular feature, structure, or characteristic, but not every embodiment necessarily includes the particular feature, structure, or characteristic. Further, repeated use of the phrase "in one embodiment" does not necessarily refer to the same embodiment, although it may.

As used herein, unless otherwise specified the use of the ordinal adjectives "first", "second", "third" etc., to describe a common object, merely indicate that different instances of like objects are being referred to, and are not intended to imply that the objects so described must be in a given sequence, either temporally, spatially, in ranking, or in any other manner.

Some embodiments may be used in conjunction with various devices and systems, for example, a User Equipment (UE), a Bluetooth device, a Bluetooth Low Energy (BLE) device, a Mobile Device (MD), a wireless station (STA), a Personal Computer (PC), a desktop computer, a mobile computer, a laptop computer, a notebook computer, a tablet computer, a server computer, a handheld computer, a handheld device, a wearable device, a sensor device, an Internet of Things (IoT) device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), and the like.

Some embodiments may be used in conjunction with devices and/or networks operating in accordance with existing IEEE 802.11 standards (including IEEE 802.11-2016 (*IEEE 802.11-2016, IEEE Standard for Information technology—Telecommunications and information exchange between systems Local and metropolitan area networks—Specific requirements Part 11: Wireless LAN Medium Access Control (MAC) and Physical Layer (PHY) Specifications*, Dec. 7, 2016)) and/or future versions and/or derivatives thereof, devices and/or networks operating in accordance with existing WFA Peer-to-Peer (P2P) specifications (*WiFi P2P technical specification, version 1.7, Jul. 6, 2016*) and/or future versions and/or derivatives thereof, devices and/or networks operating in accordance with existing cellular specifications and/or protocols, e.g., 3rd Generation Partnership Project (3GPP), 3GPP Long Term Evolution (LTE) and/or future versions and/or derivatives thereof, units and/or devices which are part of the above networks, and the like.

Some embodiments may be used in conjunction with one way and/or two-way radio communication systems, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some embodiments may be used in conjunction with one or more types of wireless communication signals and/or systems, for example, Radio Frequency (RF), Infra Red (IR), Frequency-Division Multiplexing (FDM), Orthogonal FDM (OFDM), Orthogonal Frequency-Division Multiple Access (OFDMA), Time-Division Multiplexing (TDM), Time-Division Multiple Access (TDMA), Multi-User MIMO (MU-MIMO), Spatial Division Multiple Access (SDMA), Extended TDMA (E-TDMA), General Packet Radio Service (GPRS), Extended GPRS, Code-Division Multiple Access (CDMA), Wideband CDMA (WCDMA), CDMA 2000, single-carrier CDMA, multi-carrier CDMA, Multi-Carrier Modulation (MCM), Discrete Multi-Tone (DMT), Bluetooth®, Global Positioning System (GPS), Wi-Fi, Wi-Max, ZigBee™, Ultra-Wideband (UWB), Global System for Mobile communication (GSM), 2G, 2.5G, 3G, 3.5G, 4G, Fifth Generation (5G), or Sixth Generation (6G) mobile networks, 3GPP, Long Term Evolution (LTE), LTE Advanced, Enhanced Data rates for GSM Evolution (EDGE), or the like. Other embodiments may be used in various other devices, systems and/or networks.

The term "wireless device", as used herein, includes, for example, a device capable of wireless communication, a communication device capable of wireless communication, a communication station capable of wireless communication, a portable or non-portable device capable of wireless communication, or the like. In some demonstrative embodiments, a wireless device may be or may include a peripheral that is integrated with a computer, or a peripheral that is attached to a computer. In some demonstrative embodiments, the term "wireless device" may optionally include a wireless service.

The term "communicating" as used herein with respect to a communication signal includes transmitting the communication signal and/or receiving the communication signal. For example, a communication unit, which is capable of communicating a communication signal, may include a transmitter to transmit the communication signal to at least one other communication unit, and/or a communication receiver to receive the communication signal from at least one other communication unit. The verb communicating may be used to refer to the action of transmitting or the action of receiving. In one example, the phrase "communicating a signal" may refer to the action of transmitting the signal by a first device, and may not necessarily include the action of receiving the signal by a second device. In another example, the phrase "communicating a signal" may refer to the action of receiving the signal by a first device, and may not necessarily include the action of transmitting the signal by a second device. The communication signal may be transmitted and/or received, for example, in the form of Radio Frequency (RF) communication signals, and/or any other type of signal.

As used herein, the term "circuitry" may refer to, be part of, or include, an Application Specific Integrated Circuit (ASIC), an integrated circuit, an electronic circuit, a processor (shared, dedicated, or group), and/or memory (shared, dedicated, or group), that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

The term "logic" may refer, for example, to computing logic embedded in circuitry of a computing apparatus and/or computing logic stored in a memory of a computing apparatus. For example, the logic may be accessible by a processor of the computing apparatus to execute the computing logic to perform computing functions and/or operations. In one example, logic may be embedded in various types of memory and/or firmware, e.g., silicon blocks of various chips and/or processors. Logic may be included in, and/or implemented as part of, various circuitry, e.g. radio circuitry, receiver circuitry, control circuitry, transmitter circuitry, transceiver circuitry, processor circuitry, and/or the like. In one example, logic may be embedded in volatile memory and/or non-volatile memory, including random access memory, read only memory, programmable memory, magnetic memory, flash memory, persistent memory, and the like. Logic may be executed by one or more processors using memory, e.g., registers, stuck, buffers, and/or the like, coupled to the one or more processors, e.g., as necessary to execute the logic.

Some demonstrative embodiments may be used in conjunction with a WLAN, e.g., a WiFi network. Other embodiments may be used in conjunction with any other suitable wireless communication network, for example, a wireless area network, a "piconet", a WPAN, a WVAN and the like.

Some demonstrative embodiments may be used in conjunction with a wireless communication network communicating over a frequency band of 2.4 GHz, or 5 GHz. However, other embodiments may be implemented utilizing any other suitable wireless communication frequency bands, for example, an Extremely High Frequency (EHF) band (the millimeter wave (mmWave) frequency band), e.g., a frequency band within the frequency band of between 20 GHz and 300 GHz, a WLAN frequency band, a WPAN frequency band, and the like.

The term "antenna", as used herein, may include any suitable configuration, structure and/or arrangement of one or more antenna elements, components, units, assemblies and/or arrays. In some embodiments, the antenna may implement transmit and receive functionalities using separate transmit and receive antenna elements. In some embodiments, the antenna may implement transmit and receive functionalities using common and/or integrated transmit/receive elements. The antenna may include, for example, a phased array antenna, a single element antenna, a set of switched beam antennas, and/or the like.

Reference is now made to FIG. 1, which schematically illustrates a block diagram of a system 100, in accordance with some demonstrative embodiments.

As shown in FIG. 1, in some demonstrative embodiments system 100 may include a wireless communication network including one or more wireless communication devices, e.g., wireless communication device 102, and/or at least one wireless communication device 140.

In some demonstrative embodiments, wireless communication device 102 may include, for example, a UE, an MD, a STA, an AP, a PC, a desktop computer, a mobile computer, a laptop computer, an Ultrabook™ computer, a notebook computer, a tablet computer, a server computer, a handheld computer, an Internet of Things (IoT) device, a sensor device, a handheld device, a wearable device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "Carry Small Live Large" (CSLL) device, an Ultra Mobile Device (UMD), an Ultra Mobile PC (UMPC), a Mobile Internet Device (MID), an "Origami" device or computing device, a device that supports Dynamically Composable Computing (DCC), a context-aware device, a video device, an audio device, an A/V device, a Set-Top-Box (STB), a Blu-ray disc (BD) player, a BD recorder, a Digital Video Disc (DVD) player, a High Definition (HD) DVD player, a DVD recorder, a HD DVD recorder, a Personal Video Recorder (PVR), a broadcast HD receiver, a video source, an audio source, a video sink, an audio sink, a stereo tuner, a broadcast radio receiver, a flat panel display, a Personal Media Player (PMP), a digital video camera (DVC), a digital audio player, a speaker, an audio receiver, an audio amplifier, a gaming device, a data source, a data sink, a Digital Still camera (DSC), a media player, a Smartphone, a television, a music player, or the like.

In some demonstrative embodiments, device 102 and/or device 140 may include, operate as, and/or perform the functionality of one or more STAs. For example, device 102 may include at least one STA, and/or device 140 may include at least one STA.

In some demonstrative embodiments, device 102 and/or device 140 may include, operate as, and/or perform the functionality of one or more WLAN STAs.

In some demonstrative embodiments, device 102 and/or device 140 may include, operate as, and/or perform the functionality of one or more Wi-Fi STAs.

In one example, a station (STA) may include a logical entity that is a singly addressable instance of a medium access control (MAC) and physical layer (PHY) interface to the wireless medium (WM). The STA may perform any other additional or alternative functionality.

In some demonstrative embodiments, device 102 and/or device 140 may include, operate as, and/or perform the functionality of, any other devices and/or STAs.

In some demonstrative embodiments, device 102 may include a STA and/or device 140 may include an access point (AP) STA.

In one example, device 140 may be configured to operate as, perform one or more operations of, and/or to perform the functionality of, an AP; and/or device 102 may be configured to operate as, and/or to perform the functionality of, a non-AP STA.

In one example, an AP may include an entity that contains a station (STA), e.g., one STA, and provides access to distribution services, via the wireless medium (WM) for associated STAs. The AP may perform any other additional or alternative functionality.

In one example, a non-AP STA may include a STA that is not contained within an AP. The non-AP STA may perform any other additional or alternative functionality.

In some demonstrative embodiments, device 102 may include, for example, one or more of a processor 191, an input unit 192, an output unit 193, a memory unit 194, and/or a storage unit 195. Device 102 may optionally include other suitable hardware components and/or software components. In some demonstrative embodiments, some or all of the components of device 102 may be enclosed in a common housing or packaging, and may be interconnected or operably associated using one or more wired or wireless links. In other embodiments, components of device 102 may be distributed among multiple or separate devices.

In some demonstrative embodiments, processor 191 may include, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multi-purpose or specific processor or controller. Processor 191 executes instructions, for example, of an Operating System (OS) of device 102 and/or of one or more suitable applications.

In some demonstrative embodiments, input unit 192 may include, for example, a keyboard, a keypad, a mouse, a touch-screen, a touch-pad, a track-ball, a stylus, a microphone, or other suitable pointing device or input device. Output unit 193 includes, for example, a monitor, a screen, a touch-screen, a flat panel display, a Light Emitting Diode (LED) display unit, a Liquid Crystal Display (LCD) display unit, a plasma display unit, one or more audio speakers or earphones, or other suitable output devices.

In some demonstrative embodiments, memory unit 194 includes, for example, a Random Access Memory (RAM), a Read Only Memory (ROM), a Dynamic RAM (DRAM), a Synchronous DRAM (SD-RAM), a flash memory, a volatile memory, a non-volatile memory, a cache memory, a buffer, a short term memory unit, a long term memory unit, or other suitable memory units. Storage unit 195 includes, for example, a hard disk drive, a floppy disk drive, a Compact Disk (CD) drive, a CD-ROM drive, a DVD drive, or other suitable removable or non-removable storage units. Memory unit 194 and/or storage unit 195, for example, may store data processed by device 102.

In some demonstrative embodiments, wireless communication device 102 may be capable of communicating content, data, information and/or signals via a wireless medium (WM) 103.

In some demonstrative embodiments, wireless medium 103 may include, for example, a radio channel, a channel, a cellular channel, a Global Navigation Satellite System (GNSS) Channel, an RF channel, a WiFi channel, an IR channel, and the like.

In some demonstrative embodiments, wireless communication medium 103 may include a 2.4 GHz frequency band, and/or one or more other wireless communication frequency bands, for example, a 5 GHz frequency band, a millimeter-Wave (mmWave) frequency band, e.g., a 60 GHz frequency band, a Sub-1 GHz (S1G) band, and/or any other frequency band.

In some demonstrative embodiments, devices 102 and/or 140 may include one or more radios including circuitry and/or logic to perform wireless communication between devices 102, 140 and/or one or more other devices. For example, device 102 may include at least one radio 114.

In some demonstrative embodiments, radio 114 may include one or more wireless receivers (Rx) including circuitry and/or logic to receive wireless communication signals, RF signals, frames, blocks, transmission streams, packets, messages, data items, and/or data. For example, radio 114 may include at least one receiver 116.

In some demonstrative embodiments, radio 114 may include one or more wireless transmitters (Tx) including circuitry and/or logic to transmit wireless communication signals, RF signals, frames, blocks, transmission streams, packets, messages, data items, and/or data. For example, radio 114 may include at least one transmitter 118.

In some demonstrative embodiments, radio 114, transmitter 118, and/or receiver 116 may include circuitry; logic; Radio Frequency (RF) elements, circuitry and/or logic; baseband elements, circuitry and/or logic; modulation elements, circuitry and/or logic; demodulation elements, circuitry and/or logic; amplifiers; analog to digital and/or digital to analog converters; filters; and/or the like.

In some demonstrative embodiments, radio 114 may be configured to communicate over a 2.4 GHz band and/or any other band.

In some demonstrative embodiments, radio 114 may include, or may be associated with, one or more antennas.

In one example, device 102 may include a single antenna 107. In another example, device 102 may include two or more antennas 107.

Antennas 107 may include any type of antennas suitable for transmitting and/or receiving wireless communication signals, blocks, frames, transmission streams, packets, messages and/or data. For example, antennas 107 may include any suitable configuration, structure and/or arrangement of one or more antenna elements, components, units, assemblies and/or arrays. In some embodiments, antennas 107 may implement transmit and receive functionalities using separate transmit and receive antenna elements. In some embodiments, antennas 107 may implement transmit and receive functionalities using common and/or integrated transmit/receive elements.

In some demonstrative embodiments, device 102 may include a controller 124. Controller 124 may be configured to perform and/or to trigger, cause, instruct and/or control device 102 to perform, one or more communications, to generate and/or communicate one or more messages and/or transmissions, and/or to perform one or more functionalities, operations and/or procedures between devices 102, 140, and/or one or more other devices, e.g., as described below.

In some demonstrative embodiments, controller 124 may include, or may be implemented, partially or entirely, by circuitry and/or logic, e.g., one or more processors including circuitry and/or logic, memory circuitry and/or logic, Media-Access Control (MAC) circuitry and/or logic, Physical Layer (PHY) circuitry and/or logic, baseband (BB) circuitry and/or logic, a BB processor, a BB memory, Application Processor (AP) circuitry and/or logic, an AP processor, an AP memory, and/or any other circuitry and/or logic, configured to perform the functionality of controller 124. Additionally or alternatively, one or more functionalities of controller 124 may be implemented by logic, which may be executed by a machine and/or one or more processors, e.g., as described below.

In some demonstrative embodiments, at least part of the functionality of controller 124 may be implemented as part of one or more elements of radio 114.

In other embodiments, the functionality of controller 124 may be implemented as part of any other element of device 102.

In some demonstrative embodiments, device 102 may include a message processor 128 configured to generate, process and/or access one or more messages communicated by device 102.

In one example, message processor 128 may be configured to generate one or more messages to be transmitted by device 102, and/or message processor 128 may be configured to access and/or to process one or more messages received by device 102, e.g., as described below.

In one example, message processor 128 may include at least one first component configured to generate a message, for example, in the form of a frame, field, information element and/or protocol data unit, for example, a MAC Protocol Data Unit (MPDU); at least one second component configured to convert the message into a PHY Protocol Data Unit (PPDU), e.g., a PHY Layer Convergence Procedure (PLCP) PDU, for example, by processing the message generated by the at least one first component, e.g., by encoding the message, modulating the message and/or performing any other additional or alternative processing of the message; and/or at least one third component configured to cause transmission of the message over a wireless communication medium, e.g., over a wireless communication channel in a wireless communication frequency band, for example, by applying to one or more fields of the PPDU one or more transmit waveforms. In other aspects, message processor 128 may be configured to perform any other additional or alternative functionality and/or may include any other additional or alternative components to generate and/or process a message to be transmitted.

In some demonstrative embodiments, message processor 128 may include, or may be implemented, partially or entirely, by circuitry and/or logic, e.g., one or more processors including circuitry and/or logic, memory circuitry and/or logic, Media-Access Control (MAC) circuitry and/or logic, Physical Layer (PHY) circuitry and/or logic, BB circuitry and/or logic, a BB processor, a BB memory, AP circuitry and/or logic, an AP processor, an AP memory, and/or any other circuitry and/or logic, configured to perform the functionality of message processor 128, respectively. Additionally or alternatively, one or more functionalities of message processor 128 may be implemented by logic, which may be executed by a machine and/or one or more processors, e.g., as described below.

In some demonstrative embodiments, at least part of the functionality of message processor 128 may be implemented as part of radio 114.

In some demonstrative embodiments, at least part of the functionality of message processor 128 may be implemented as part of controller 124.

In other embodiments, the functionality of message processor 128 may be implemented as part of any other element of device 102.

In some demonstrative embodiments, at least part of the functionality of controller 124 and/or message processor 128 may be implemented by an integrated circuit, for example, a chip, e.g., a System on Chip (SoC). In one example, the chip or SoC may be configured to perform one or more functionalities of radio 114. For example, the chip or SoC may include one or more elements of controller 124, one or more elements of message processor 128, and/or one or more elements of radio 114. In one example, controller 124, message processor 128, and radio 114 may be implemented as part of the chip or SoC.

In other embodiments, controller 124, message processor 128 and/or radio 114 may be implemented by one or more additional or alternative elements of device 102.

In some demonstrative embodiments, device 102 and/or device 140 may include, operate as, perform the role of, and/or perform one or more functionalities of, one or more STAs.

In some demonstrative embodiments, device 102 and/or device 140 may form, or may communicate as part of, a wireless local area network (WLAN).

In some demonstrative embodiments, device 102 and/or device 140 may form, or may communicate as part of, a WiFi network.

In other embodiments, device 102 and/or device 140 may form, and/or communicate as part of, any other additional or alternative network.

In some demonstrative embodiments, device 102 may be configured to perform an active scan, for example, to find and/or discover one or more APs, e.g., device 140.

In some demonstrative embodiments, the active scan may include transmitting one or more probe requests from device 102, and listening and/or waiting for one or more probe responses and/or one or more beacons from one or more APs, e.g., AP 140, following the probe requests.

In one example, an active scan, e.g., in accordance with an IEEE 802.11 Standard, may include sending one or more probe requests and waiting for one or more probe responses and/or beacons, e.g., from one or more APs.

In some demonstrative embodiments, a dwell time (also referred to as a "channel dwell") may be defined as a time a device, e.g., device 102, listens for probe responses and beacons following a transmission of a probe request, for example, before the device switches to a next wireless communication channel to be scanned.

Reference is made to FIG. 2, which schematically illustrates an active scan 200, which may be implemented in accordance with some demonstrative embodiments.

In some demonstrative embodiments, a STA may be configured to transmit a single probe request, for example, during a dwell time 220.

As shown in FIG. 2, the STA may transmit a probe request 210 and may wait to receive one or more probe responses during the dwell time 220, e.g., in response to the probe request 210. For example, as shown in FIG. 2, a first probe response 222 may be received from a first AP, denoted "AP1", a second probe response 224 may be received from a second AP, denoted "AP2", and/or a third probe response 226 may be received from a third AP, denoted "AP3".

As shown in FIG. 2, when the active scan completes, the device may have discovered three APs, e.g., AP1, AP2 and/or AP3, for example, during dwell time 220.

Reference is made to FIG. 3, which schematically illustrates an active scan 300, which may be implemented in accordance with some demonstrative embodiments.

In some demonstrative embodiments, a STA may be configured to transmit a plurality of probe requests 310, for example, during a scan time 320 over a wireless communication channel.

As shown in FIG. 3, the STA may continue to transmit the probe requests 310, for example, even after receiving, e.g., in response to a probe requests 310, a probe response 322 from an AP, denoted "AP1, for example, during the scan time 320.

Referring back to FIG. 1, in some demonstrative embodiments, a device, e.g., device 102, may use one or more scan parameters, for example, to configure the active scan, e.g., as described below.

In some demonstrative embodiments, the one or more active scan parameters may include a dwell time, a count of probe requests to be transmitted, a probe request transmission rate, and/or any other additional or alternative parameter.

In some demonstrative embodiments, in some use cases, deployments and/or scenarios, it may be inefficient an disadvantageous to use static scan parameters, e.g., static values for the dwell time, the number of probe requests and/or the probe request transmission rate, for example, regardless of the surrounding environment, e.g., as described below For example, static scan parameters, which may be optimal for one environment may not be optimal for one or more different environments.

In one example, in some use cases, deployments and/or scenarios, implementation of static scan parameters may result in poor user experience and/or may prevent connection and/or roaming time, for example when the static scan parameters are not suitable for the environment.

In another example, in some use cases, deployments and/or scenarios, implementation of static scan parameters may lead to a long scan time and/or to unnecessary power consumption, which may shorten battery time, for example, when the static scan parameters are not suitable for the environment.

In some demonstrative embodiments, different environments, for example, a WiFi scanned-channel, may include a different number of APs, STAs and/or aggressors. Therefore, when defining in advance, a set of scan parameters, e.g., an optimal set of scan parameters, for one environment, the predefined set of scan parameters may not be optimal for another environment.

For example, a STA may define, e.g., in advance, an optimal set of scan parameters for a scanned channel, e.g., the dwell time, the number of probes to be transmitted and/or the probe request transmission rate, for example, while considering a resulted power consumption of the device, a scan time and/or a scan quality. According to this example, the set of scan parameters may not be optimal, for example, if the same set of scan parameters is used for different environments.

For example, STAs that are optimized for dense environments may have a long scan time and/or a high power consumption, e.g., when placed in quiet environments.

In one example, there may be high collision probability in dense environments, which may result in a long delay between a transmission time of a probe request and a reception time of probe responses from all APs, e.g., in response to the probe request. Therefore, STAs that are optimized for dense environments may have a long scan time, e.g., when placed in quiet environments.

In another example, in dense environments, due to multiple collisions, one or more probe-responses may not be received from one or more of the APs, This may be addressed by a long dwell time and/or transmission of more than a single probe-request per scanned wireless communication channel. Therefore STAs that are optimized for dense environments may have a long scan time, e.g., when placed in quiet environments.

For example, STAs that are optimized for quiet environments may have degraded scan results, e.g., only part of the APs may be discovered, for example, when placed in dense environments.

In some demonstrative embodiments, a STA, e.g., device 102, may move between locations, for example, from a dense environment to a quiet environment, and vice versa.

Therefore, using the static scan parameters may be disadvantageous over time, e.g., as the static scan parameters may not be suitable for multiple types of environments.

In some demonstrative embodiments, in some use cases, deployments and/or scenarios, using a static dwell time per scanning channel and/or for a plurality of channels may have one or more inefficiencies, disadvantages and/or technical problems, e.g., as described below.

In one example, using an increased dwell time for a wireless communication channel and/or for all wireless communication channels, may allow sufficient time to receive probe responses and beacons, e.g., with high probability, but may increase power consumption and/or may reduce performance of concurrent data transfer operations, for example, if a STA is out of a serving channel during a scanning operation.

In some demonstrative embodiments, in some use cases, deployments and/or scenarios, it may be disadvantageous and/or inefficient to use a static dwell time per scanning channel and/or retransmission policies, for example, if one or more conditions of an environment are not taken into consideration, e.g., as described below.

For example, channels that are commonly set as factory defaults by popular AP vendors, e.g., a channel 6, may be assigned with longer dwell times relative to other channels, and/or with retransmission policies. However, implementation of longer dwell times and/or retransmission policies when they are not required, e.g. in quiet environments, may increase power consumption and/or may reduce performance.

In some demonstrative embodiments, device 102 may be configured to select an active scan configuration, for example, according to one or more attributes of an environment of device 102, e.g., as described below.

In some demonstrative embodiments, device 102 may be configured to maintain a database of scan parameter sets, e.g., a set per environment type. For example, a scan parameter set for an environment may define one or more suitable parameters to be used for an active scan in the environment, for example, a suitable dwell time, a number of probe requests, and/or a probe request transmission rate per environment type, e.g., as described below.

In some demonstrative embodiments, the database of scan parameter sets may be determined, prepared, configured, defined and/or updated, for example, based on one or more simulations, for example, of different environments, e.g., as described below.

In other embodiments, one or more predefined scan parameter sets may be configured, for example, based on any other theoretic and/or empirical information, and the like.

In some demonstrative embodiments, device 102 may be configured to collect environment data on an environment, e.g., a number of APs, a channel load, and the like, for example, when scanning a wireless communication channel, e.g., as described below.

In some demonstrative embodiments, device 102 may be configured to use the environment data, for example, to classify the environment type of the scanned wireless communication channel, and to select a selected scan parameter set, e.g., a parameters set with a best match, that is suitable for the environment type, for example, when performing a scan on the scanned wireless communication channel, e.g., as described below.

In some demonstrative embodiments, the selected scan parameter set may be configured to optimize the active scan, for example, with respect to one or more criteria, for example, a scan time of the active scan, probability of discovering all APs during the active scan, a power consumption of device 102, and/or any other criterion, e.g., as described below.

In some demonstrative embodiments, device 102 may be configured to determine, e.g., in real time, for example, whether or not one or more scan parameters of the selected scan parameter set for a current wireless communication channel are effective, and to change them accordingly, for example, during the channel scan, e.g., as described below.

In some demonstrative embodiments, device 102 may be configured to collect the environment data and/or to change the scan parameters, for example, according to environment changes and/or a success ratio, e.g., a ratio between a number of discovered APs, which are discovered in a current scan, and a previous number of discovered APs, which were discovered during one or more previous active scan operations on the wireless communication channel, e.g., as described below.

In some demonstrative embodiments, device 102 may be configured to adjust and/or adapt one or more active scan parameters, e.g., per a scanned wireless communication channel, for example, based on a current and/or real environment of the scanned wireless communication channel, for example, in order to determine and/or adapt a suitable dwell time, a suitable number of probe requests and/or a suitable probe request transmission rate for that environment, e.g., as described below.

In some demonstrative embodiments, an active scanning procedure may effect one or more user experience (UX) parameters, e.g., a connection time, a power consumption, roaming, a latency and/or a performance. Accordingly, device 102 may be configured, for example, to implement an active scanning procedure, which may be configured to take into consideration one or more, e.g., some or all, of the UX parameters.

In some demonstrative embodiments, device 102 may be configured to implement an active scanning procedure, which may be configured to support machine learning methods of dynamically changing active-scan parameters, e.g., in real time and/or non-real time, for example, by analyzing environment data from a surrounding environment, e.g., as described below.

In some demonstrative embodiments, the active scanning procedure may support an active scan, for example, based on simulations and/or real-life controlled environment experiments, e.g., as described below.

In some demonstrative embodiments, the active scanning procedure may be configured to support a non real-time scan parameters optimization, for example, between scan cycles, e.g., as described below.

In some demonstrative embodiments, the scanning procedure may be configured to support a real-time scan parameters optimization, for example, during an active scan, for example, even during each channel scan, e.g., as described below.

Figure 4:
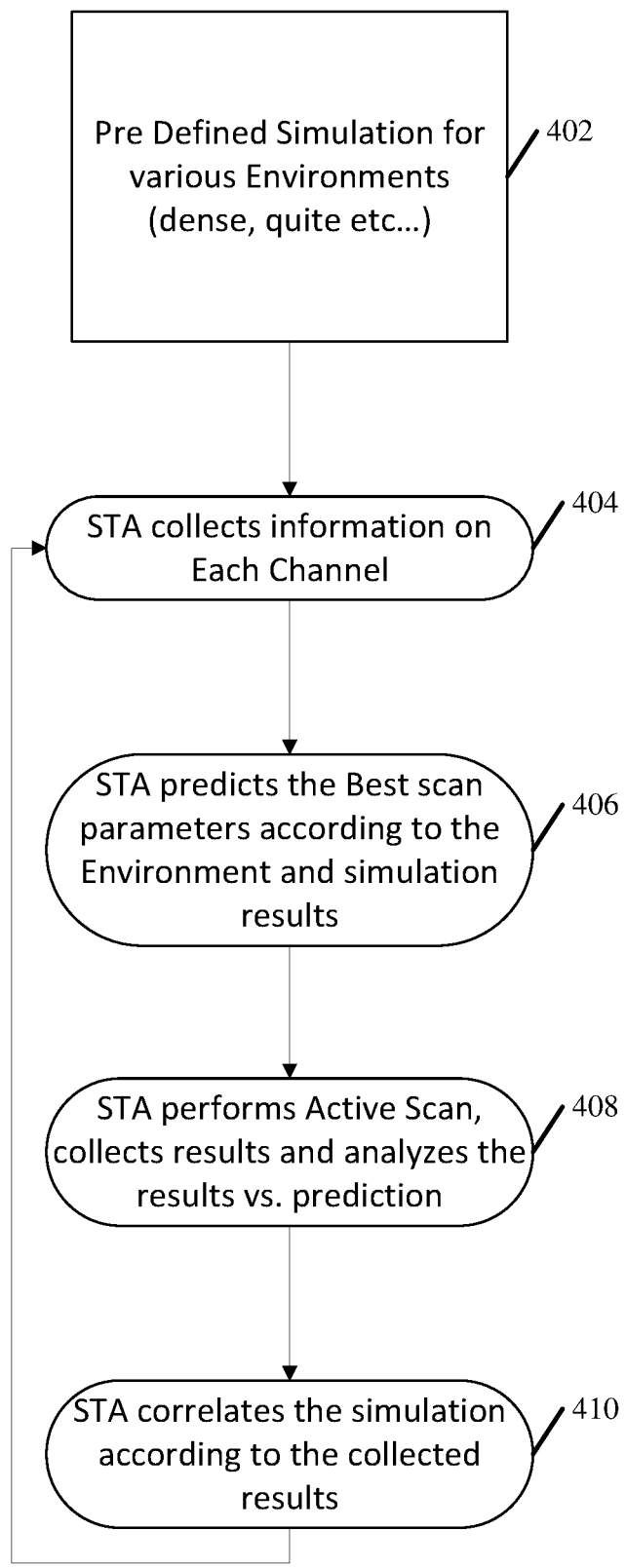
FIG. 4 is a schematic flow-chart illustration of a method of active scanning, in accordance with some demonstrative embodiments.

Reference is made to FIG. 4, which schematically illustrates a method of active scanning, in accordance with some demonstrative embodiments. For example, one or more operations of the method of FIG. 4 may be performed by one or more elements of a system, e.g., system 100 (FIG. 1), for example, one or more wireless devices, e.g., device 102 (FIG. 1), a controller, e.g., controller 124 (FIG. 1), a radio, e.g., radio 114 (FIG. 1), a receiver, e.g., receiver 116 (FIG. 1), and/or a message processor, e.g., message processor 128 (FIG. 1).

As indicated at block 402, the method may include maintaining a plurality of active scan configurations, for example, to determine an initial scan parameter set per each environment. For example, the plurality of active scan configurations may include at least one first set per a first environment, e.g., a quiet environment, and/or at least one second different set per a second environment, e.g., a dense environment. For example, device 102 (FIG. 1) may be configured to maintain the plurality of active scan configurations, e.g., as described below.

In some demonstrative embodiments, the plurality of active scan configurations may be based on one or more theoretical and/or empirical calculations and/or tests, e.g., including one or more predefined simulations for various environments, which may be performed, for example, in a lab, a manufacturing facility, and/or the like.

As indicated at block 404, the method may include collecting environment data on a channel, e.g., even for each channel, for example, a number of APs, a channel load, and the like. For example, device 102 (FIG. 1) may be configured to collect the information on the wireless communication channel to be scanned, e.g., as described below.

As indicated at block 406, the method may include determining, e.g., by prediction, a scan parameter set, e.g., the best suitable parameter set, for a scanned wireless communication channel, for example, according to the environment of the scanned wireless communication channel, and/or the simulation results corresponding to the environment. For example, device 102 (FIG. 1) may be configured the determine the predicted scan parameter set based on the environment data and/or the simulation results, e.g., as described below.

As indicated at block 408, the method may include performing an active scan, e.g., using the scan parameter set, collecting results of the active scan, and analyzing the results, e.g., with respect to the prediction. For example, device 102 (FIG. 1) may be configured to perform the active scan while analyzing results of the active scan, e.g., as described below.

As indicated at block 410, the method may include adapting the scan parameter set, for example, by correlating between the predicted results, e.g., according to simulation, and the actual results of the active scan. For example, device 102 (FIG. 1) may be configured to adapt the scan parameter set based on the results of the active scan, e.g., as described below.

Referring back to FIG. 1, in some demonstrative embodiments, controller 124 may be configured to control, cause, trigger and/or instruct device 102 to perform one or more operations of the method of FIG. 4, e.g., as described below.

In some demonstrative embodiments, controller 124 may be configured to control, cause, trigger and/or instruct device 102 to maintain active scan configuration information defining a plurality of active scan configurations corresponding to a respective plurality of predefined environment types, e.g., as described below.

In some demonstrative embodiments, the plurality of environment types may include two or more environments types representing two or more respective different wireless communication density levels, e.g., as described below.

In some demonstrative embodiments, the plurality of environment types may include two or more environment types representing two or more respective different counts of Access Points (APs), e.g., as described below.

In some demonstrative embodiments, controller 124 may be configured to control, cause, trigger and/or instruct device 102 to classify a wireless communication channel as a selected environment type from the plurality of predefined environment types, for example, based on scan results of at least one first active scan over the wireless communication channel, e.g., as described below.

In some demonstrative embodiments, controller 124 may be configured to control, cause, trigger and/or instruct device 102 to classify the wireless communication channel as the selected environment type, for example, based on a count of detected Access Points (APs) over the wireless communication channel, e.g., as described below.

In some demonstrative embodiments, controller 124 may be configured to control, cause, trigger and/or instruct device 102 to classify the wireless communication channel as the selected environment type, for example, based on a detected channel load over the wireless communication channel, a received signal strength of one or more probe responses received over the wireless communication channel, a detected number of STAs over the wireless communication channel, and/or any other additional or alternative parameter and/or attribute of the wireless communication channel, e.g., as described below.

In some demonstrative embodiments, controller 124 may be configured to control, cause, trigger and/or instruct device 102 to perform at least one second active scan over the wireless communication channel, for example, according to a selected active scan configuration corresponding to the selected environment type, e.g., as described below.

In some demonstrative embodiments, the selected active scan configuration may include a definition of a dwell time, a count of probe requests, a probe request transmission rate, and/or any other active scan parameter and/or attribute, e.g., as described below.

In some demonstrative embodiments, the active scan configuration information may be based on predefined simulations and/or other calculations and/or tests, for example, for a plurality of environment types, e.g., a plurality of various WiFi environment types.

In some demonstrative embodiments, the environment types may include one or more scenarios, for example, ranging from quiet and/or controlled environments, e.g., a consumer household, to noisy and/or congested environments, e.g., an enterprise, airports, shopping malls, and the like.

In one example, the simulation results may be compared and/or correlated to a controlled environment testing, and final active scan configurations, for example, the plurality of active scan configurations may be based on the simulations and/or the environment testing.

In some demonstrative embodiments, the simulations may be configured to measure a suitable dwell time, for example, to support discovery of a predefined percentage of APs over a scanned wireless communication channel, e.g., as described below.

In some demonstrative embodiments, the simulations may be applied over low-band and/or high-band channels, for example, to support different durations of probe requests.

In some demonstrative embodiments, the simulations may be configured to support different numbers of APs on the wireless communication channel, and/or different channel loads over the wireless communication channel.

In some demonstrative embodiments, the simulations may be configured to determine, for example, if a transmission of an additional probe-request may increase a scan reliability. For example, when increasing the dwell time above a certain value a number of discovered APs may not necessarily increase.

Figure 5:
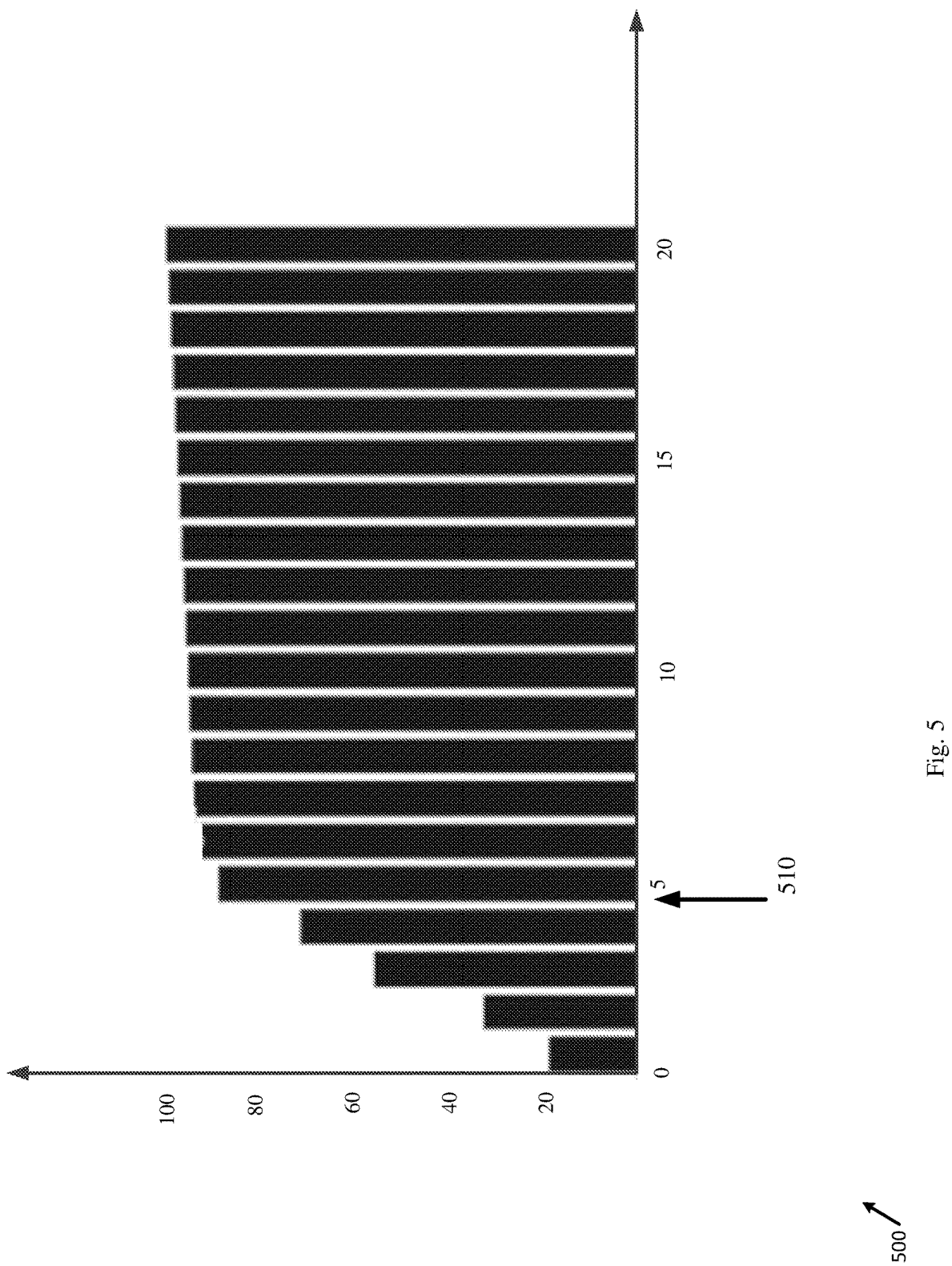
FIG. 5 is a schematic illustration of a graph depicting probabilities of successful reception of probe responses for different dwell times, which may be implemented in accordance with some demonstrative embodiments.

Reference is made to FIG. 5, which schematically illustrates a graph 500 depicting probabilities of successful reception of probe responses for different dwell times, in accordance with some demonstrative embodiments.

In one example, graph 500 may be based on simulation results of a required dwell time to receive probe responses with high probability, for example, as a function of a number of APs that receive the probe requests, and try to acquire the wireless communication channel, and send probe responses. For example, graph 500 shows simulation results of probabilities of reception of probe responses from a predefined number of APs, e.g., 7 APs, at different dwell times, when transmitting a probe request.

In some demonstrative embodiments, as shown in FIG. 5, a dwell time 510 of about 5 time units (TU) may achieve a high reliability of about 90%, while dwell times greater than 5 TU may not achieve a significantly higher probability to receive probe responses.

In some demonstrative embodiments, the simulation results may be utilized to determine a plurality of active scan configurations corresponding to a plurality of different predefined environment types.

In some demonstrative embodiments, the plurality of environment types may include different counts of APs.

In some demonstrative embodiments, the plurality of environment types may be defined to include six environment types, for example, based on the count of APs, e.g., as described below.

In some demonstrative embodiments, an active scan configuration corresponding to an environment type of the six environment types may include a first dwell time for a first probe request, a first probe request transmission rate for the first probe request, a second dwell time for a second probe request, and/or a second probe request transmission rate for the second probe request, e.g., as follows:

In some demonstrative embodiments, device 102 may be configured to perform the first active scan, for example, based on a preconfigured active scan configuration, e.g., as described below.

In one example, the preconfigured active scan configuration may include a pre-configured geographic location configuration, for example, as device 102 may be assumed to have no knowledge of surrounding channel conditions, e.g., prior to the first active scan.

In some demonstrative embodiments, device 102 may be configured to use long dwell times, e.g., for the first active scan, for example, for one or more predefined high priority channels according to a regulatory region, for example, as a single scan may not be power consuming over time and/or may have a limited impact on one or more other off-channel activities.

For example, in some regulatory regions, a first active scan over one or more WiFi non-overlapping social channels, e.g., wireless communication channels 1, 6, 11, may be performed with a long dwell time, for example, since the social channels have an increased probability to include an increased number of APs. A following scan, e.g., after the first scan, for example, the second active scan, may use data collected during the first scan and/or may continue to collect data on the surrounding environment, e.g., as described below.

In some demonstrative embodiments, at least two preconfigured active scan configurations may be defined for two different environments, e.g., two density levels of environments, for example, based on simulations and/or any other calculations and/or test, e.g., as described below.

In one example, a first preconfigured active scan configuration may be suitable for a quiet environment on a hi-band channel with up to 4 APs. The first preconfigured active scan configuration may include first active scan parameters

TABLE 1

| 2.4 GHz Band | 0\1 APs | 2\3 APs | 4\5 APs | 6\7APs | 8\9 APs | 10+ APs |
|---|---|---|---|---|---|---|
| Original % Success (Dwell) | 100% (20) | 98% (20) | 93% (20) | 71% (20) | 43% (20) | |
| 1st Dwell recommended [TU] | 15 | 20 | 10 | 10 | 15 | 60 |
| 1st Probe rate | 1 Mbps | 1 Mbps | 6 Mbps | 6 Mbps | 6 Mbps | 1 Mbps |
| 2nd probe\rate | No | no | Yes\1 Mbps | Yes\1 Mbps | Yes\1 Mbps | Yes\6 Mbps |
| 2nd probe additional Dwell [TU] | No | no | 25 | 30 | 40 | 40 |
| % success (overall dwell) | 100% (15) | 98% (20) | 99% (35) | 97% (40) | 93% (55) | 99% (100) |
| % success (overall dwell) without 2nd probe | — | — | 94% (35) | 87% (40) | 83% (55) | 99% (100) |

In some demonstrative embodiments, device 102 may be configured to maintain one or more scan parameter sets, which may be based on one or more, e.g., some or all, of the scan configurations of Table 1.

In one example, for example, according to the first row of Table 1 ("Original %Success"), a reduced success ratio may be achieved by an active scan, for example, with an increase of a number of APs in an environment, for example, if the active scan is configured, e.g., if a constant dwell time of 20 Time Units (TUs) is used, while not taking one or more attributes of the environment into account.

In one example, device 102 may use active scan parameters, for example, according to the $3^{rd}$ column of Table 1, for a second active scan of a wireless communication channel, for example, if a first active scan detected 2 or 3 APs over the wireless communication channel.

including, for example, a single probe request, a probe request transmission rate of 6 Mbps, and/or a dwell time of 10 milliseconds (ms).

In another example, a second preconfigured active scan configuration may be suitable for a very noisy and/or dense environment on a hi-band channel with more than 10 APs. The second preconfigured active scan configuration may include second active scan parameters including, for example, two probe requests, a probe request transmission rate of 6 Mbps for both of the probe requests, a dwell time of 60 ms for the first probe request, and/or a dwell time of 60 ms for the second probe request.

According to these examples, there may be a big difference for the scan-time between the two preconfigured active scan configuration, e.g., a scan time of 10 ms in the first configuration and a scan time of 120 ms in the second configuration. Therefore, using the silent environment set in a noisy environment may result with a very low discovery rate, while using the noisy environment set in a silent environment may result with a scan time, which may even be 10 times longer than needed.

In other embodiments, any other additional or alternative preconfigured active scan configuration including any other additional or alternative active scan parameters may be used.

In some demonstrative embodiments, device 102 may be configured to adjust one or more of the active scan parameters, e.g., as described below.

In some demonstrative embodiments, controller 124 may be configured to control, cause, trigger and/or instruct device 102 to perform the at least one second active scan, for example, based on one or more active scan parameters defined by the selected active scan configuration, for example, according to a selected configuration of Table 1, and/or any other configuration, e.g., as described below.

In some demonstrative embodiments, controller 124 may be configured to control, cause, trigger and/or instruct device 102 to determine one or more adjusted active scan parameters, for example, based on scan results of the at least one second active scan, e.g., as described below.

In some demonstrative embodiments, controller 124 may be configured to control, cause, trigger and/or instruct device 102 to perform one or more third active scans, for example, based on the one or more adjusted active scan parameters, e.g., as described below.

In some demonstrative embodiments, controller 124 may be configured to control, cause, trigger and/or instruct device 102 to determine the one or more adjusted active scan parameters, for example, based on a determination that the wireless communication channel is to be classified as another environment type, e.g., as described below.

In some demonstrative embodiments, controller 124 may be configured to control, cause, trigger and/or instruct device 102 to determine the one or more adjusted active scan parameters, for example, based on a change in a count of detected APs, e.g., as described below.

In some demonstrative embodiments, controller 124 may be configured to control, cause, trigger and/or instruct device 102 STA to determine the one or more adjusted active scan parameters, for example, based on a channel load, a scan success ratio, and/or any other alternative or additional parameter e.g., as described below.

In some demonstrative embodiments, the scan success ratio may represent a level of successful detection of an expected count of APs over the wireless communication channel, e.g., as described below.

In one example, device 102 may be configured to monitor the environment, for example, based on a channel load, a number of APs, a scan success ratio for each wireless communication channel, and/or any other parameter. According to this example, device 102 may be configured to select a matching simulation scenario, e.g., from Table 1, and/or to select an active scan parameter set, e.g., an optimal scan parameter set, for example, according to Table 1, e.g., including the dwell time, the number of probe requests and/or the probe request transmission rates.

In some demonstrative embodiments, device 102 may be configured to correlate between the scan results and the simulations, for example, even after each active scan, and to change the active scan parameters accordingly, for example, based on an assumption that real life environment may be different from a theoretical simulation.

In one example, device 102 may be configured to track a number of discovered APs, e.g., per each scanned wireless communication channel, during the last n scan cycles, for example, three cycles, e.g., n=3 or any other number; and/or to track a channel-load per each scanned wireless communication channel, for example, during the last n scan cycles.

In some demonstrative embodiments, device 102 may be configured to select an active scan parameter set, for example, when performing a new active scan, for example, based on the simulation results and/or or controlled environment testing, for example, according to Table 1. For example, device 102 may be configured to select an active scan parameter set, which may match, for example, the tracked number of APs, e.g., the expected number of APs, and/or the tracked channel-load, e.g., the expected channel-load, over the scanned wireless communication channel.

In some demonstrative embodiments, device 102 may be configured to use scan results, e.g., of the second active scan, on the scanned wireless communication channel, for example, in a same way it used the simulation results, and/or to update a selected scan parameter set, for example, while applying the active scan and/or using the selected scan parameters-set, e.g., as described below.

For example, device 102 may increase the dwell time, e.g., in one or more Time Units (TUs), for example, if device 102 identifies that less than the expected number of APs were discovered; and/or device 102 may decrease the dwell time, e.g., in one or more TUs, for example, if device 102 identifies that all expected APs were discovered, for example, before completion of the dwell time, e.g., as described below.

Figure 6:
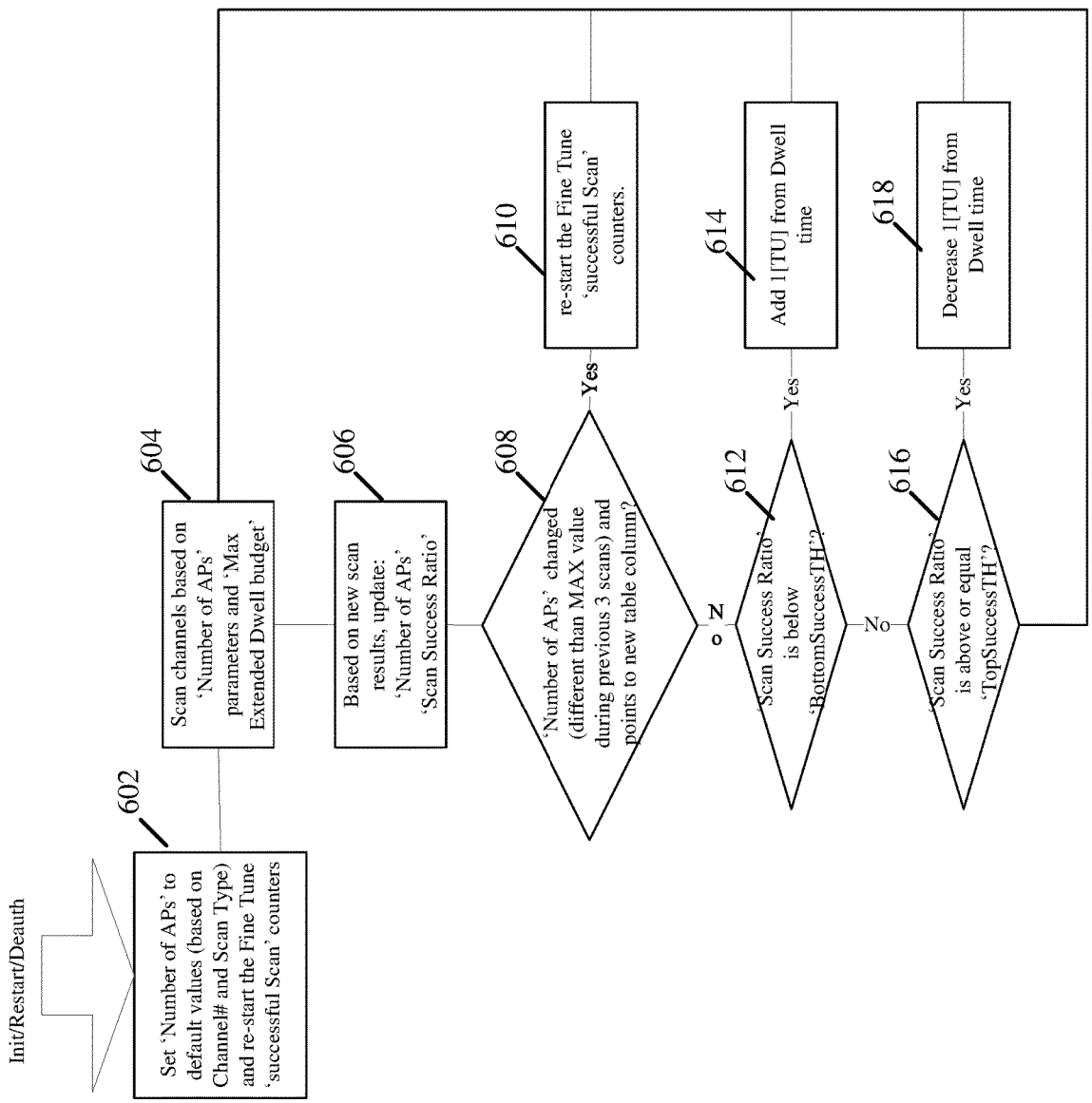
FIG. 6 is a schematic flow-chart illustration of a method of adjusting active scan parameters, in accordance with some demonstrative embodiments.

Reference is made to FIG. 6, which schematically illustrates a method of adjusting active scan parameters, in accordance with some demonstrative embodiments. For example, one or more of the operations of the method of FIG. 6 may be performed by one or more elements of a system, e.g., system 100 (FIG. 1), for example, one or more wireless devices, e.g., device 102 (FIG. 1), a radio, e.g., radio 114 (FIG. 1), a receiver, e.g., receiver 116 (FIG. 1), a controller, e.g., controller 124 (FIG. 1), and/or a message processor, e.g., message processor 128 (FIG. 1).

In one example, the method of FIG. 6 may be implemented by a STA, e.g., device 102 (FIG. 1), for example, to adapt to optimal active scan parameters, for example, based on simulations and/or feedback in real time, e.g., in scan after scan, which may significantly increase performance of the STA.

As indicated at block 602, the method may include setting an initial scan parameter set, and resetting one or more counters. For example, controller 124 may be configured to control, cause, trigger and/or instruct device 102 (FIG. 1) to set the initial scan parameter set, for example, by setting a number of APs, e.g., according to a preconfigured active scan configuration, for example, based on a Channel Number and/or a Scan Type, and/or by resetting one or more fine tune counters.

In one example, a STA, e.g., device 102 may be configured to maintain a fine tune successful scan counter, for example, to maintain a scan success ratio of the device.

In some demonstrative embodiments, for example, the scan success ratio may include a ratio between a number of currently discovered APs in an active scan, and an expected number of APs, which is expected to be discovered during the active scan.

In some demonstrative embodiments, for example, the expected number of APs may be based on a number of previously discovered APs, for example, according to one or more previous active scans.

As indicated at block 604, the method may include performing an active scan over a plurality of wireless communication channels based on active scan parameters of the preconfigured active scan configuration and/or a total time for scanning for all the plurality of wireless communication channel, denoted "Max Extended Dwell budget". For example, controller 124 may be configured to control, cause, trigger and/or instruct device 102 (FIG. 1) to scan the plurality of wireless communication channels, for example, according to the preconfigured active scan configuration, e.g., as described above.

As indicated at block 606, the method may include updating the number of APs and a scan success ratio, for example, based on results of the active scan. For example, controller 124 may be configured to control, cause, trigger and/or instruct device 102 (FIG. 1) to update the number of APs and the scan success ratio, for example, based on results of the active scan, e.g., as described below.

As indicated at block 608, the method may include determining whether or not the updated number of APs is different from the previous number of APs, and whether the updated number of APs would indicate a change in environment, e.g., a change in a column of Table 1. For example, controller 124 may be configured to control, cause, trigger and/or instruct device 102 (FIG. 1) to determine whether or not the updated number of APs is greater than a maximal number of APs detected during a predefined number of last scans, for example, three last scans, e.g., as described above.

In one example, device 102 (FIG. 1) may determine whether the number of APs is different from a maximal value of the number of APS, which have been detected, for example, during a predefined number of previous scans, e.g., 3 previous scans, and/or if the number of updated APs points to a different column of Table 1.

As indicated at block 610, the method may include resetting the fine-tune counters, for example, when the number of APs has changed and points to a different environment, e.g., another column of Table 1. For example, controller 124 may be configured to control, cause, trigger and/or instruct device 102 (FIG. 1) to reset the fine-tune counters, for example, when the number of APs has changed and points to another column of Table 1.

As indicated at block 612, the method may include determining whether or not the scan success ratio is below a predefined first threshold, e.g., a low threshold, denoted "BottomSuccessTH", for example, if the answer at block 608 is "no". For example, controller 124 may be configured to control, cause, trigger and/or instruct device 102 (FIG. 1) to determine whether or not the scan success ratio is below the predefined first threshold.

As indicated at block 614, the method may include adding a predefined number of TUs, e.g., 1 TU, to the dwell time, for example, if the scan success ratio is below the first threshold. For example, controller 124 may be configured to control, cause, trigger and/or instruct device 102 (FIG. 1) may be configured to add the one or more TUs to the dwell time, for example, if the scan success ratio is below the predefined first threshold.

As indicated at block 616, the method may include determining whether or not the scan success ratio is equal to or above a predefined second threshold, e.g., a predefined high threshold, denoted "TopSuccessTH". For example, controller 124 may be configured to control, cause, trigger and/or instruct device 102 (FIG. 1) to determine whether or not the scan success ratio is equal or above the predefined second threshold.

As indicated at block 618, the method may include decreasing a predefined number of TUs, e.g., 1 TU, from the dwell time, for example, if the scan success ratio is above the predefined second threshold. For example, controller 124 may be configured to control, cause, trigger and/or instruct device 102 (FIG. 1) to decrease one or more TUs from the dwell time, for example, if the scan success ratio is above the predefined second threshold.

Referring a back to FIG. 1, in demonstrative embodiments, device 102 may be configured to dynamically adjust, e.g., in real-time, one or more of the active scan parameters, for example, during an active scan, e.g., as described below.

In some demonstrative embodiments, controller 124 may be configured to control, cause, trigger and/or instruct device 102 to dynamically adjust the second active scan, for example, based on one or more parameters detected during the second active scan, e.g., as described below.

In some demonstrative embodiments, the one or more parameters detected during the second active scan may include a count of detected APs, a received signal strength of one or more probe responses, a channel load, a delay time to receive the one or more probe responses, an available air time, a detected number of STAs, a scan success ratio, and/or any other additional or alternative parameters and/or attributes.

In some demonstrative embodiments, controller 124 may be configured to control, cause, trigger and/or instruct device 102 to adjust a duration of the second active scan, a count of probe requests to be transmitted during the second active scan, a dwell time after transmission of a probe request, a probe request transmission rate, and/or any other additional or alternative active scan parameter, e.g., as described below.

In some demonstrative embodiments, device 102 may be configured to track one or more inputs and/or to change an operational state of device 102, for example, during an active scan over a wireless communication channel.

In some demonstrative embodiments, the one or more inputs may include, for example, a number of APs over the wireless communication channel, an RSSI of each AP, a response time of an AP to answer a probe request with a probe response, a channel load over the wireless communication channel, e.g., from wireless communication devices or aggressors, an available air-time off the wireless communication channel, a number of STAs over the wireless communication channel, a scan success ratio, and/or any other additional or alternative input or parameter.

In one example, device 102 may discover that 5 APs are on a current wireless communication channel, and may apply a long dwell time, for example, due to a high channel load with multiple probe requests. However, for example, after a single probe request and a short dwell time, all 5 APs may be detected. According to this example, device 102 may allow another short dwell time, for example, to allow discovering a new AP, and may terminate the active scan, for example, despite the original scan parameters, e.g., even if the long dwell time is not completed. On the other hand, if not all APs were discovered, device 102 may extend the long dwell time, e.g., to an even longer dwell time, and/or may send one or more additional probe requests.

In some demonstrative embodiments, device 102 may be configured to consider Received Signal Strength Indicators (RSSIs) from one or more remote APs, for example, as very far APs or weak signal APs may not always be detected by device 102. For example, the active scan parameters may not be adjusted, for example, based on the remote APs, which may not be useful, for example, as connection to the remote APs may result in degraded or even bad user experience.

In some demonstrative embodiments, device 102 may be configured to reset one or more parameters of the active scan configuration, for example, upon detection of a significant environment change. For example, device 102 may be configured to reset the dwell time, the number of probe requests and the transmission rates of the probe request to their initial values, e.g., according to Table 1. Such environment change may be identified, for example, based on significant RSSI changes from one or more APs, e.g., tracked APs, based on an indication from movement and/or acceleration sensors, and the like.

In some demonstrative embodiments, device 102 may be configured to select a bit rate of a transmitted probe request from a plurality of predefined bit-rates, e.g., "basic rates", for example, according to an *IEEE*802.11 *Standard*.

In one example, the higher the bit-rate of the probe-request, the shorter the airtime the probe-request consumes. However, a far AP may not be able to receive probe requests, for example, when using a higher bit-rate, for example, as successful reception may require a high Signal to Noise Ratio (SNR). Therefore, device 102 may be configured to change the probe request bit-rate, for example, while considering regulatory and/or design limitations, which may impact a maximum transmit power per bit-rate for a wireless communication channel.

Figure 7:
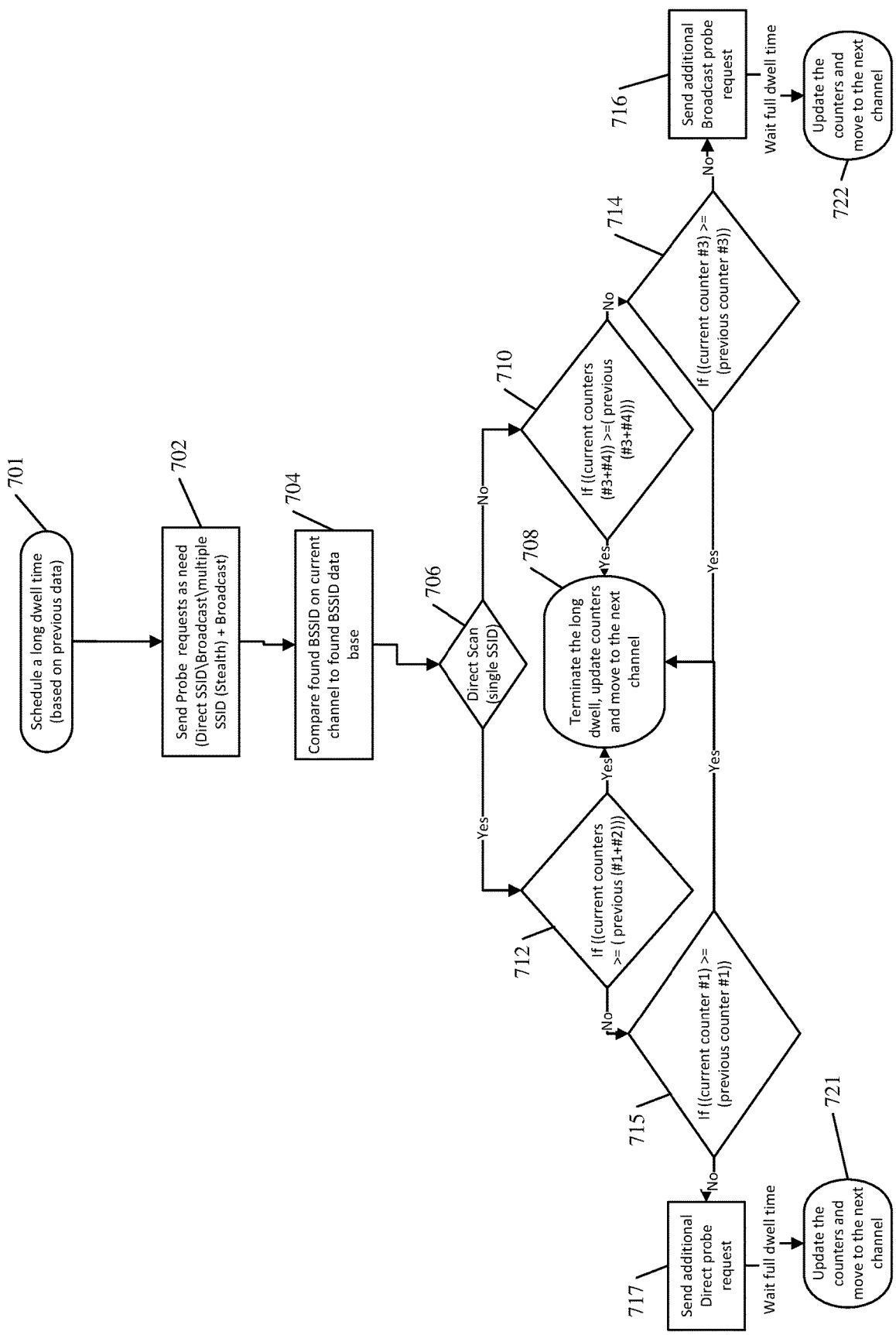
FIG. 7 is a schematic flow-chart illustration of a method of dynamically adjusting active scan parameters, in accordance with some demonstrative embodiments.

Reference is made to FIG. 7, which schematically illustrates a method of dynamically adjusting active scan parameters, in accordance with some demonstrative embodiments. For example, one or more of the operations of the method of FIG. 7 may be performed by one or more elements of a system, e.g., system 100 (FIG. 1), for example, one or more wireless devices, e.g., device 102 (FIG. 1), a radio, e.g., radio 114 (FIG. 1), a receiver, e.g., receiver 116 (FIG. 1), a controller, e.g., controller 124 (FIG. 1), and/or a message processor, e.g., message processor 128 (FIG. 1).

As indicated at block 701, the method may include scheduling a preconfigured, e.g., long, dwell time, for example, based on previously configured environment data. For example, controller 124 may be configured to control, cause, trigger and/or instruct device 102 to schedule the preconfigured long dwell time, for example, based on previously configured environment data, e.g., as described above.

As indicated at block 702, the method may include sending one or more probe requests during an active scan. For example, controller 124 may be configured to control, cause, trigger and/or instruct device 102 (FIG. 1) to send the probe requests, for example, based on the previously configured environment data.

In one example, the probe requests may be transmitted according to a Direct Service Set identifier (SSID) transmission, a broadcast transmission, or a multiple SSID transmission, e.g., Stealth and Broadcast.

As indicated at block 704, the method may include comparing one or more detected APs, e.g., one or more detected Basic SSIDs (BSSIDs), which may be found on a current wireless communication channel, to one or more predicted APs, which are expected to be detected, e.g., according to a BSSID database. For example, controller 124 may be configured to control, cause, trigger and/or instruct device 102 (FIG. 1) to compare between the detected APs and the predicted APs.

As indicated at block 706, the method may include identifying whether the active scan is according to a direct scan, e.g., for detection of a single SSID, or a broadcast mode.

In some demonstrative embodiments, a STA, e.g., device 102, may be configured to maintain one or more counters, e.g., four counters, for example, to count a number of detected APs, e.g., as described below.

In some demonstrative embodiments, the STA may maintain a first counter, denoted counter #1, to count APs, e.g., of BSSIDs having a desired SSID, seen with an RSSI value greater than a first predefined RSSI value, e.g., RSSI>−82 dBm.

In some demonstrative embodiments, the STA may maintain a second counter, denoted counter #2, to count APs, e.g., of BSSIDs having the desired SSID, seen with an RSSI value lower than a second predefined RSSI value, e.g., RSSI<−82 dBm.

As indicated at block 712, the method may include determining whether or not the number of currently detected APs with the desired SSID has changed, e.g., relative to the previous scans, for example, when the active scan includes a direct scan. For example, controller 124 may be configured to control, cause, trigger and/or instruct device 102 (FIG. 1) to determine whether or not the current values of counters #1 and #2 are equal or greater than the previous values of counters #1 and #2, respectively.

As indicated at block 715, the method may include determining whether or not a current value of counter #1 is equal to or greater than a previous value of counter #1, for example, when at least one of the current values of counters #1 and #2 is lower than the previous values of counters #1 and #2, respectively. For example, controller 124 may be configured to control, cause, trigger and/or instruct device 102 (FIG. 1) to determine whether or not the current value of counter #1 is equal to or greater than the previous value of counter #1.

As indicated at block 717, the method may include selecting to send an additional direct probe request, for example, when the current value of counter #1 is lower than the previous value of counter #1. For example, controller 124 may be configured to control, cause, trigger and/or instruct device 102 (FIG. 1) to send the additional direct probe request.

As indicated at block 721, the method may include updating the counters and moving to the next wireless communication channel, for example, after waiting for the full dwell time. For example, controller 124 may be configured to control, cause, trigger and/or instruct device 102 (FIG. 1) to update the counters and/or to move to the next wireless communication channel, for example, after the transmission of the additional direct probe request and waiting for the full dwell time.

In some demonstrative embodiments, the STA may maintain a third counter, denoted counter #3, to count all APs, e.g., of any/all BSSIDs, seen with an RSSI value greater than a third predefined RSSI value, e.g., RSSI>−82 dBm.

In some demonstrative embodiments, the STA may maintain a fourth counter, denoted counter #4, to count all APs, e.g., all/any BSSIDs, seen with an RSSI value lower than a fourth predefined RSSI value, e.g., RSSI<−82 dBm.

As indicated at block 710, the method may include determining whether or not the number of any currently detected APs has changed, e.g., relative to the previous scans, for example, by determining whether current values of counters #3 and #4 are equal or greater than previous values of counters #3 and #4, respectively, for example, when the active scan is not a direct scan. For example, controller 124 may be configured to control, cause, trigger and/or instruct device 102 (FIG. 1) to determine whether or not the current values of counters #3 and #4 are equal or greater than the previous values of counters #3 and #4, respectively.

As indicated at block 714, the method may include determining whether or not a current value of counter #3 is equal or greater than a previous value of counter #3, for example, when at least one of the current values of counters #3 and #4 is lower than the previous values of counters #3 and #4, respectively. For example, controller 124 may be configured to control, cause, trigger and/or instruct device 102 (FIG. 1) to determine whether or not the current value of counter #3 is equal or greater than the previous value of counter #3.

As indicated at block 708, the method may include terminating the dwell time, updating the one or more counters and moving to a next wireless communication channel, for example, if the answer at block 710, block 712, block 714 or block 715 is yes. For example, controller 124 may be configured to control, cause, trigger and/or instruct device 102 (FIG. 1) to terminate the increased dwell time, to update the one or more counters, and to move to the next wireless communication channel.

As indicated at block 716, the method may include sending an additional broadcast probe request, for example, if the current value of counter #3 is lower than the previous value of counter #3, and the active scan is performed in the broadcast scan mode. For example, controller 124 may be configured to control, cause, trigger and/or instruct device 102 (FIG. 1) to send the additional broadcast probe request.

As indicated at block 722, the method may include updating the counters and moving to the next wireless communication channel, for example, after transmission of the additional broadcast probe request and waiting for the full dwell time. For example, controller 124 may be configured to control, cause, trigger and/or instruct device 102 (FIG. 1) to update the counters and/or to move to the next wireless communication channel, for example, after the transmission the additional broadcast probe request.

Figure 8:
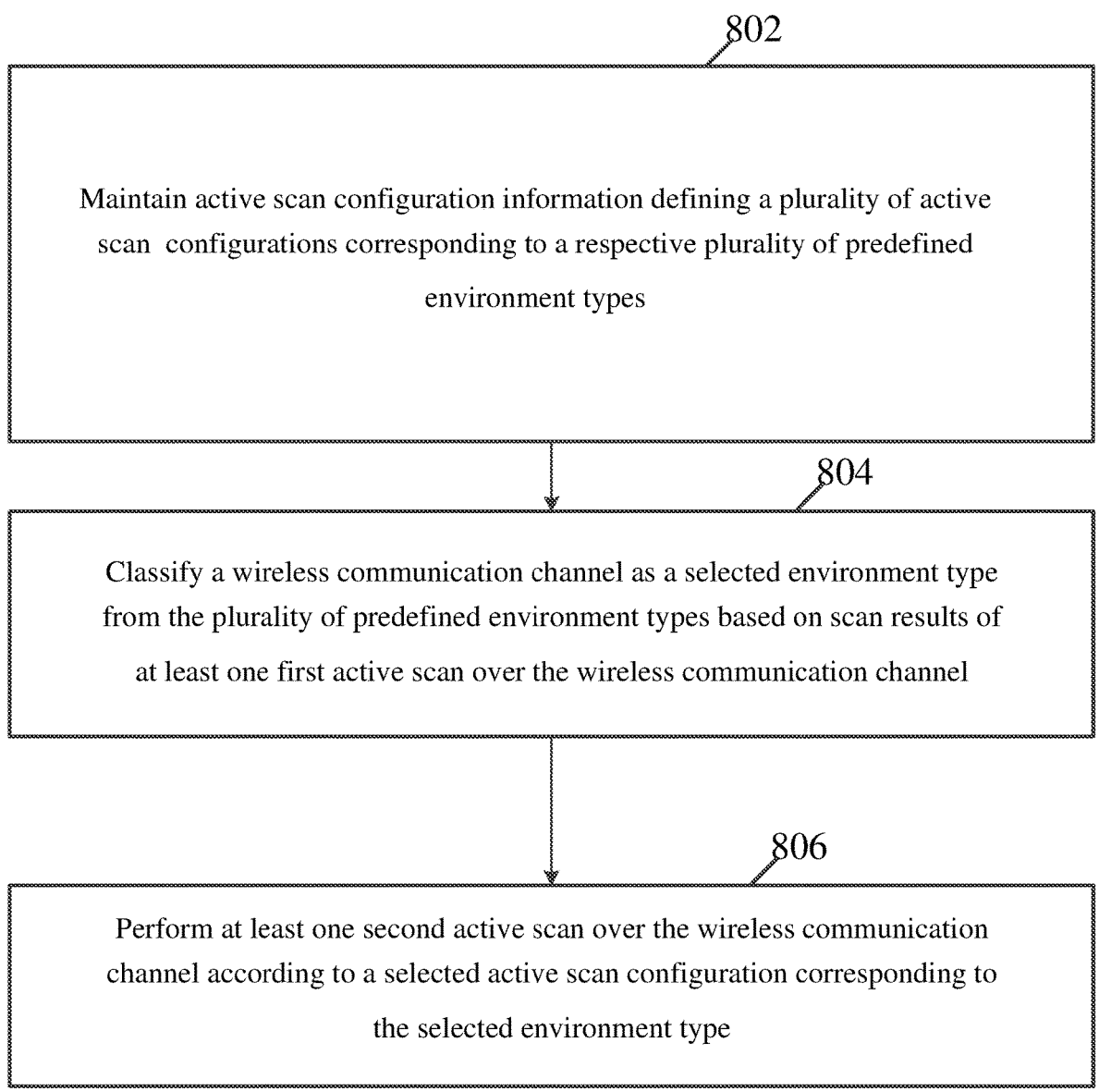
FIG. 8 is a schematic flow-chart illustration of a method of active scanning, in accordance with some demonstrative embodiments.

Reference is made to FIG. 8, which schematically illustrates a method of active scanning, in accordance with some demonstrative embodiments. For example, one or more of the operations of the method of FIG. 8 may be performed by one or more elements of a system, e.g., system 100 (FIG. 1), for example, one or more wireless devices, e.g., device 102 (FIG. 1), a radio, e.g., radio 114 (FIG. 1), a receiver, e.g., receiver 116 (FIG. 1), a controller, e.g., controller 124 (FIG. 1), and/or a message processor, e.g., message processor 128 (FIG. 1).

As indicated at block 802, the method may include maintaining active scan configuration information defining a plurality of active scan configurations corresponding to a respective plurality of predefined environment types. For example, controller 124 (FIG. 1) may be configured to control, cause, trigger and/or instruct device 102 (FIG. 1) to maintain the active scan configuration information defining the plurality of active scan configurations corresponding to the respective plurality of predefined environment types, e.g., as described above.

As indicated at block 804, the method may include classifying a wireless communication channel as a selected environment type from the plurality of predefined environment types based on scan results of at least one first active scan over the wireless communication channel. For example, controller 124 (FIG. 1) may be configured to control, cause, trigger and/or instruct device 102 (FIG. 1) to classify the wireless communication channel as the selected environment type from the plurality of predefined environment types based on the scan results of the first active scan over the wireless communication channel, e.g., as described above.

As indicated at block 806, the method may include performing at least one second active scan over the wireless communication channel according to a selected active scan configuration corresponding to the selected environment type. For example, controller 124 (FIG. 1) may be configured to control, cause, trigger and/or instruct device 102 (FIG. 1) to perform the second active scan over the wireless communication channel according to the selected active scan configuration corresponding to the selected environment type, e.g., as described above.

Figure 9:
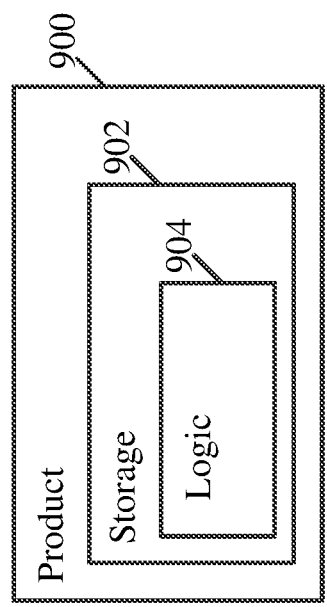
FIG. 9 is a schematic illustration of a product of manufacture, in accordance with some demonstrative embodiments.

Reference is made to FIG. 9, which schematically illustrates a product of manufacture 900, in accordance with some demonstrative embodiments. Product 900 may include one or more tangible computer-readable ("machine-readable") non-transitory storage media 902, which may include computer-executable instructions, e.g., implemented by logic 904, operable to, when executed by at least one computer processor, enable the at least one computer processor to implement one or more operations at device 102 (FIG. 1), radio 114 (FIG. 1), receiver 116 (FIG. 1), transmitter 118 (FIG. 1), controller 124 (FIG. 1), and/or message processor 128 (FIG. 1), to cause device 102 (FIG. 1), radio 114 (FIG. 1), receiver 116 (FIG. 1), transmitter 118 (FIG. 1), controller 124 (FIG. 1), and/or message processor 128 (FIG. 1) to perform, trigger and/or implement one or more operations and/or functionalities, and/or to perform, trigger and/or implement one or more operations and/or functionalities described with reference to the FIGS. 1, 2, 3, 4, 5, 6, 7, and/or 8, and/or one or more operations described herein. The phrases "non-transitory machine-readable medium" and "computer-readable non-transitory storage media" may be directed to include all computer-readable media, with the sole exception being a transitory propagating signal.

In some demonstrative embodiments, product 900 and/or machine-readable storage media 902 may include one or more types of computer-readable storage media capable of storing data, including volatile memory, non-volatile memory, removable or non-removable memory, erasable or non-erasable memory, writeable or re-writeable memory, and the like. For example, machine-readable storage media 1002 may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EEPROM), Compact Disk ROM (CD-ROM), Compact Disk Recordable (CD-R), Compact Disk Rewriteable (CD-RW), flash memory (e.g., NOR or NAND flash memory), content addressable memory (CAM), polymer memory, phase-change memory, ferroelectric memory, silicon-oxide-nitride-oxide-silicon (SONOS) memory, a disk, a floppy disk, a hard drive, an optical disk, a magnetic disk, a card, a magnetic card, an optical card, a tape, a cassette, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some demonstrative embodiments, logic 904 may include instructions, data, and/or code, which, if executed by a machine, may cause the machine to perform a method, process and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some demonstrative embodiments, logic 904 may include, or may be implemented as, software, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner or syntax, for instructing a processor to perform a certain function. The instructions may be implemented using any suitable high-level, low-level, object-oriented, visual, compiled and/or interpreted programming language, such as C, C++, Java, BASIC, Matlab, Pascal, Visual BASIC, assembly language, machine code, and the like.

EXAMPLES

The following examples pertain to further embodiments.

Example 1 includes an apparatus comprising logic and circuitry configured to cause a wireless communication station (STA) to maintain active scan configuration information defining a plurality of active scan configurations corresponding to a respective plurality of predefined environment types; classify a wireless communication channel as a selected environment type from the plurality of predefined environment types based on scan results of at least one first active scan over the wireless communication channel; and perform at least one second active scan over the wireless communication channel according to a selected active scan configuration corresponding to the selected environment type.

Example 2 includes the subject matter of Example 1, and optionally, wherein the plurality of environment types comprises two or more environment types representing two or more respective different counts of Access Points (APs).

Example 3 includes the subject matter of Example 1 or 2, and optionally, wherein the apparatus is configured to cause the STA to classify the wireless communication channel as the selected environment type based on a count of detected Access Points (APs) over the wireless communication channel.

Example 4 includes the subject matter of any one of Examples 1-3, and optionally, wherein the plurality of environment types comprises two or more environment types representing two or more respective different wireless communication density levels.

Example 5 includes the subject matter of any one of Examples 1-4, and optionally, wherein the apparatus is configured to cause the STA to classify the wireless communication channel as the selected environment type based on at least one of a detected channel load over the wireless communication channel, a received signal strength of one or more probe responses received over the wireless communication channel, or a detected number of STAs over the wireless communication channel.

Example 6 includes the subject matter of any one of Examples 1-5, and optionally, wherein the apparatus is configured to cause the STA to perform the at least one second active scan based on one or more active scan parameters defined by the selected active scan configuration, to determine one or more adjusted active scan parameters based on scan results of the at least one second active scan, and to perform one or more third active scans based on the one or more adjusted active scan parameters.

Example 7 includes the subject matter of Example 6, and optionally, wherein the apparatus is configured to cause the STA to determine the one or more adjusted active scan parameters based on a change in a count of detected Access Points (APs).

Example 8 includes the subject matter of Example 6 or 7, and optionally, wherein the apparatus is configured to cause the STA to determine the one or more adjusted active scan parameters based on at least one of a channel load, or a scan success ratio representing a level of successful detection of an expected count of Access Points (APs) over the wireless communication channel.

Example 9 includes the subject matter of any one of Examples 6-8, and optionally, wherein the apparatus is configured to cause the STA to determine the one or more adjusted active scan parameters based on a determination that the wireless communication channel is to be classified as another environment type.

Example 10 includes the subject matter of any one of Examples 1-9, and optionally, wherein the apparatus is configured to cause the STA to dynamically adjust the second active scan based on one or more parameters detected during the second active scan.

Example 11 includes the subject matter of Example 10, and optionally, wherein the apparatus is configured to cause the STA to adjust at least one of a duration of the second active scan, a count of probe requests to be transmitted during the second active scan, a dwell time after transmission of a probe request, or a probe request transmission rate.

Example 12 includes the subject matter of Example 10 or 11, and optionally, wherein the one or more parameters detected during the second active scan comprise at least one of a count of detected Access Points (APs), a received signal strength of one or more probe responses, a channel load, a delay time to receive the one or more probe responses, an available air time, a detected number of STAs, or a scan success ratio.

Example 13 includes the subject matter of any one of Examples 1-12, and optionally, wherein the selected active scan configuration comprises a definition of at least one of a dwell time, a count of probe requests, and a probe request transmission rate.

Example 14 includes the subject matter of any one of Examples 1-13, and optionally, comprising a radio to transmit one or more probe requests and detect one or more probe responses.

Example 15 includes the subject matter of Example 14, and optionally, comprising one or more antennas connected to the radio, a memory, and a processor.

Example 16 includes a system comprising a wireless communication station (STA), the STA comprising one or more antennas; a radio; a memory; and a controller configured to cause the STA to maintain active scan configuration information defining a plurality of active scan configurations corresponding to a respective plurality of predefined environment types; classify a wireless communication channel as a selected environment type from the plurality of predefined environment types based on scan results of at least one first active scan over the wireless communication channel; and perform at least one second active scan over the wireless communication channel according to a selected active scan configuration corresponding to the selected environment type.

Example 17 includes the subject matter of Example 16, and optionally, wherein the plurality of environment types comprises two or more environment types representing two or more respective different counts of Access Points (APs).

Example 18 includes the subject matter of Example 16 or 17, and optionally, wherein the controller is configured to cause the STA to classify the wireless communication channel as the selected environment type based on a count of detected Access Points (APs) over the wireless communication channel.

Example 19 includes the subject matter of any one of Examples 16-18, and optionally, wherein the plurality of environment types comprises two or more environment types representing two or more respective different wireless communication density levels.

Example 20 includes the subject matter of any one of Examples 16-19, and optionally, wherein the controller is configured to cause the STA to classify the wireless communication channel as the selected environment type based on at least one of a detected channel load over the wireless communication channel, a received signal strength of one or more probe responses received over the wireless communication channel, or a detected number of STAs over the wireless communication channel.

Example 21 includes the subject matter of any one of Examples 16-20, and optionally, wherein the controller is configured to cause the STA to perform the at least one second active scan based on one or more active scan parameters defined by the selected active scan configuration, to determine one or more adjusted active scan parameters based on scan results of the at least one second active scan, and to perform one or more third active scans based on the one or more adjusted active scan parameters.

Example 22 includes the subject matter of Example 21, and optionally, wherein the controller is configured to cause the STA to determine the one or more adjusted active scan parameters based on a change in a count of detected Access Points (APs).

Example 23 includes the subject matter of Example 21 or 22, and optionally, wherein the controller is configured to cause the STA to determine the one or more adjusted active scan parameters based on at least one of a channel load, or a scan success ratio representing a level of successful detection of an expected count of Access Points (APs) over the wireless communication channel.

Example 24 includes the subject matter of any one of Examples 21-23, and optionally, wherein the controller is configured to cause the STA to determine the one or more adjusted active scan parameters based on a determination that the wireless communication channel is to be classified as another environment type.

Example 25 includes the subject matter of any one of Examples 16-24, and optionally, wherein the controller is configured to cause the STA to dynamically adjust the second active scan based on one or more parameters detected during the second active scan.

Example 26 includes the subject matter of Example 25, and optionally, wherein the controller is configured to cause the STA to adjust at least one of a duration of the second active scan, a count of probe requests to be transmitted during the second active scan, a dwell time after transmission of a probe request, or a probe request transmission rate.

Example 27 includes the subject matter of Example 25 or 26, and optionally, wherein the one or more parameters detected during the second active scan comprise at least one of a count of detected Access Points (APs), a received signal strength of one or more probe responses, a channel load, a delay time to receive the one or more probe responses, an available air time, a detected number of STAs, or a scan success ratio.

Example 28 includes the subject matter of any one of Examples 16-27, and optionally, wherein the selected active scan configuration comprises a definition of at least one of a dwell time, a count of probe requests, and a probe request transmission rate.

Example 29 includes the subject matter of any one of Examples 16-28, and optionally, wherein the radio is to transmit one or more probe requests and detect one or more probe responses.

Example 30 includes a method to be performed at a wireless communication station (STA), the method comprising maintaining active scan configuration information defining a plurality of active scan configurations corresponding to a respective plurality of predefined environment types; classifying a wireless communication channel as a selected environment type from the plurality of predefined environment types based on scan results of at least one first active scan over the wireless communication channel; and performing at least one second active scan over the wireless communication channel according to a selected active scan configuration corresponding to the selected environment type.

Example 31 includes the subject matter of Example 30, and optionally, wherein the plurality of environment types comprises two or more environment types representing two or more respective different counts of Access Points (APs).

Example 32 includes the subject matter of Example 30 or 31, and optionally, comprising classifying the wireless communication channel as the selected environment type based on a count of detected Access Points (APs) over the wireless communication channel.

Example 33 includes the subject matter of any one of Examples 30-32, and optionally, wherein the plurality of environment types comprises two or more environment types representing two or more respective different wireless communication density levels.

Example 34 includes the subject matter of any one of Examples 30-33, and optionally, comprising classifying the wireless communication channel as the selected environment type based on at least one of a detected channel load over the wireless communication channel, a received signal strength of one or more probe responses received over the wireless communication channel, or a detected number of STAs over the wireless communication channel.

Example 35 includes the subject matter of any one of Examples 30-34, and optionally, comprising performing the at least one second active scan based on one or more active scan parameters defined by the selected active scan configuration, determining one or more adjusted active scan parameters based on scan results of the at least one second active scan, and performing one or more third active scans based on the one or more adjusted active scan parameters.

Example 36 includes the subject matter of Example 35, and optionally, comprising determining the one or more adjusted active scan parameters based on a change in a count of detected Access Points (APs).

Example 37 includes the subject matter of Example 35 or 36, and optionally, comprising determining the one or more adjusted active scan parameters based on at least one of a channel load, or a scan success ratio representing a level of successful detection of an expected count of Access Points (APs) over the wireless communication channel.

Example 38 includes the subject matter of any one of Examples 35-37, and optionally, comprising determining the one or more adjusted active scan parameters based on a determination that the wireless communication channel is to be classified as another environment type.

Example 39 includes the subject matter of any one of Examples 30-38, and optionally, comprising dynamically adjusting the second active scan based on one or more parameters detected during the second active scan.

Example 40 includes the subject matter of Example 39, and optionally, comprising adjusting at least one of a duration of the second active scan, a count of probe requests to be transmitted during the second active scan, a dwell time after transmission of a probe request, or a probe request transmission rate.

Example 41 includes the subject matter of Example 39 or 40, and optionally, wherein the one or more parameters detected during the second active scan comprise at least one of a count of detected Access Points (APs), a received signal strength of one or more probe responses, a channel load, a delay time to receive the one or more probe responses, an available air time, a detected number of STAs, or a scan success ratio.

Example 42 includes the subject matter of any one of Examples 30-41, and optionally, wherein the selected active scan configuration comprises a definition of at least one of a dwell time, a count of probe requests, and a probe request transmission rate.

Example 43 includes the subject matter of any one of Examples 30-42, and optionally, comprising transmitting one or more probe requests and detecting one or more probe responses.

Example 44 includes a product comprising one or more tangible computer-readable non-transitory storage media comprising computer-executable instructions operable to, when executed by at least one processor, enable the at least one processor to cause a wireless communication station (STA) to maintain active scan configuration information defining a plurality of active scan configurations corresponding to a respective plurality of predefined environment types; classify a wireless communication channel as a selected environment type from the plurality of predefined environment types based on scan results of at least one first active scan over the wireless communication channel; and perform at least one second active scan over the wireless communication channel according to a selected active scan configuration corresponding to the selected environment type.

Example 45 includes the subject matter of Example 44, and optionally, wherein the plurality of environment types comprises two or more environment types representing two or more respective different counts of Access Points (APs).

Example 46 includes the subject matter of Example 44 or 45, and optionally, wherein the instructions, when executed, cause the STA to classify the wireless communication channel as the selected environment type based on a count of detected Access Points (APs) over the wireless communication channel.

Example 47 includes the subject matter of any one of Examples 44-46, and optionally, wherein the plurality of environment types comprises two or more environment types representing two or more respective different wireless communication density levels.

Example 48 includes the subject matter of any one of Examples 44-47, and optionally, wherein the instructions, when executed, cause the STA to classify the wireless communication channel as the selected environment type based on at least one of a detected channel load over the wireless communication channel, a received signal strength of one or more probe responses received over the wireless communication channel, or a detected number of STAs over the wireless communication channel.

Example 49 includes the subject matter of any one of Examples 44-48, and optionally, wherein the instructions, when executed, cause the STA to perform the at least one second active scan based on one or more active scan parameters defined by the selected active scan configuration, to determine one or more adjusted active scan parameters based on scan results of the at least one second active scan, and to perform one or more third active scans based on the one or more adjusted active scan parameters.

Example 50 includes the subject matter of Example 49, and optionally, wherein the instructions, when executed, cause the STA to determine the one or more adjusted active scan parameters based on a change in a count of detected Access Points (APs).

Example 51 includes the subject matter of Example 49 or 50, and optionally, wherein the instructions, when executed, cause the STA to determine the one or more adjusted active scan parameters based on at least one of a channel load, or a scan success ratio representing a level of successful detection of an expected count of Access Points (APs) over the wireless communication channel.

Example 52 includes the subject matter of any one of Examples 49-51, and optionally, wherein the instructions, when executed, cause the STA to determine the one or more adjusted active scan parameters based on a determination that the wireless communication channel is to be classified as another environment type.

Example 53 includes the subject matter of any one of Examples 44-52, and optionally, wherein the instructions, when executed, cause the STA to dynamically adjust the second active scan based on one or more parameters detected during the second active scan.

Example 54 includes the subject matter of Example 53, and optionally, wherein the instructions, when executed, cause the STA to adjust at least one of a duration of the second active scan, a count of probe requests to be transmitted during the second active scan, a dwell time after transmission of a probe request, or a probe request transmission rate.

Example 55 includes the subject matter of Example 53 or 54, and optionally, wherein the one or more parameters detected during the second active scan comprise at least one of a count of detected Access Points (APs), a received signal strength of one or more probe responses, a channel load, a delay time to receive the one or more probe responses, an available air time, a detected number of STAs, or a scan success ratio.

Example 56 includes the subject matter of any one of Examples 44-55, and optionally, wherein the selected active scan configuration comprises a definition of at least one of a dwell time, a count of probe requests, and a probe request transmission rate.

Example 57 includes an apparatus of a wireless communication station (STA), the apparatus comprising means for maintaining active scan configuration information defining a plurality of active scan configurations corresponding to a respective plurality of predefined environment types; means for classifying a wireless communication channel as a selected environment type from the plurality of predefined environment types based on scan results of at least one first active scan over the wireless communication channel; and means for performing at least one second active scan over the wireless communication channel according to a selected active scan configuration corresponding to the selected environment type.

Example 58 includes the subject matter of Example 57, and optionally, wherein the plurality of environment types comprises two or more environment types representing two or more respective different counts of Access Points (APs).

Example 59 includes the subject matter of Example 57 or 58, and optionally, comprising means for classifying the wireless communication channel as the selected environment type based on a count of detected Access Points (APs) over the wireless communication channel.

Example 60 includes the subject matter of any one of Examples 57-59, and optionally, wherein the plurality of environment types comprises two or more environment types representing two or more respective different wireless communication density levels.

Example 61 includes the subject matter of any one of Examples 57-60, and optionally, comprising means for classifying the wireless communication channel as the selected environment type based on at least one of a detected channel load over the wireless communication channel, a received signal strength of one or more probe responses received over the wireless communication channel, or a detected number of STAs over the wireless communication channel.

Example 62 includes the subject matter of any one of Examples 57-61, and optionally, comprising means for performing the at least one second active scan based on one or more active scan parameters defined by the selected active scan configuration, determining one or more adjusted active scan parameters based on scan results of the at least one second active scan, and performing one or more third active scans based on the one or more adjusted active scan parameters.

Example 63 includes the subject matter of Example 62, and optionally, comprising means for determining the one or more adjusted active scan parameters based on a change in a count of detected Access Points (APs).

Example 64 includes the subject matter of Example 62 or 63, and optionally, comprising means for determining the one or more adjusted active scan parameters based on at least one of a channel load, or a scan success ratio representing a level of successful detection of an expected count of Access Points (APs) over the wireless communication channel.

Example 65 includes the subject matter of any one of Examples 62-64, and optionally, comprising means for determining the one or more adjusted active scan parameters based on a determination that the wireless communication channel is to be classified as another environment type.

Example 66 includes the subject matter of any one of Examples 57-65, and optionally, comprising means for dynamically adjusting the second active scan based on one or more parameters detected during the second active scan.

Example 67 includes the subject matter of Example 66, and optionally, comprising means for adjusting at least one of a duration of the second active scan, a count of probe requests to be transmitted during the second active scan, a dwell time after transmission of a probe request, or a probe request transmission rate.

Example 68 includes the subject matter of Example 66 or 67, and optionally, wherein the one or more parameters detected during the second active scan comprise at least one of a count of detected Access Points (APs), a received signal strength of one or more probe responses, a channel load, a delay time to receive the one or more probe responses, an available air time, a detected number of STAs, or a scan success ratio.

Example 69 includes the subject matter of any one of Examples 57-68, and optionally, wherein the selected active scan configuration comprises a definition of at least one of a dwell time, a count of probe requests, and a probe request transmission rate.

Example 70 includes the subject matter of any one of Examples 57-69, and optionally, comprising means for transmitting one or more probe requests and detecting one or more probe responses.

Functions, operations, components and/or features described herein with reference to one or more embodiments, may be combined with, or may be utilized in combination with, one or more other functions, operations, components and/or features described herein with reference to one or more other embodiments, or vice versa.

While certain features have been illustrated and described herein, many modifications, substitutions, changes, and equivalents may occur to those skilled in the art. It is, therefore, to be understood that the appended claims are intended to cover all such modifications and changes as fall within the true spirit of the disclosure.

What is claimed is:

1. An apparatus comprising logic and circuitry configured to cause a wireless communication station (STA) to:
   maintain active scan configuration information defining a plurality of active scan configurations corresponding to a respective plurality of predefined environment types, the plurality of active scan configurations comprising at least a first active scan configuration and a second active scan configuration, the first active scan configuration comprising a first setting of at least one of a dwell time, a count of probe requests, or a probe request transmission rate, the second active scan configuration comprising a second setting, different from the first setting, of at least one of the dwell time, the count of probe requests, or the probe request transmission rate;
   classify a wireless communication channel as a selected environment type from the plurality of predefined environment types based on scan results of at least one first active scan over the wireless communication channel;
   select from the plurality of active scan configurations a selected active scan configuration corresponding to the selected environment type; and
   perform at least one second active scan over the wireless communication channel according to the selected active scan configuration corresponding to the selected environment type.

2. The apparatus of claim 1, wherein the plurality of environment types comprises two or more environment types representing two or more respective different counts of Access Points (APs).

3. The apparatus of claim 1 configured to cause the STA to classify the wireless communication channel as the selected environment type based on a count of detected Access Points (APs) over the wireless communication channel.

4. The apparatus of claim 1, wherein the plurality of environment types comprises two or more environment types representing two or more respective different wireless communication density levels.

5. The apparatus of claim 1 configured to cause the STA to classify the wireless communication channel as the selected environment type based on at least one of a detected channel load over the wireless communication channel, a received signal strength of one or more probe responses received over the wireless communication channel, or a detected number of STAs over the wireless communication channel.

6. The apparatus of claim 1 configured to cause the STA to perform the at least one second active scan based on one or more active scan parameters defined by the selected active scan configuration, to determine one or more adjusted active scan parameters based on scan results of the at least one second active scan, and to perform one or more third active scans based on the one or more adjusted active scan parameters.

7. The apparatus of claim 6 configured to cause the STA to determine the one or more adjusted active scan parameters based on a change in a count of detected Access Points (APs).

8. The apparatus of claim 6 configured to cause the STA to determine the one or more adjusted active scan parameters based on at least one of a channel load, or a scan success ratio representing a level of successful detection of an expected count of Access Points (APs) over the wireless communication channel.

9. The apparatus of claim 6 configured to cause the STA to determine the one or more adjusted active scan parameters based on a determination that the wireless communication channel is to be classified as another environment type.

10. The apparatus of claim 1 configured to cause the STA to dynamically adjust the second active scan based on one or more parameters detected during the second active scan.

11. The apparatus of claim 10 configured to cause the STA to adjust at least one of a duration of the second active scan, a count of probe requests to be transmitted during the second active scan, a dwell time after transmission of a probe request during the second active scan, or a probe request transmission rate during the second active scan.

12. The apparatus of claim 10, wherein the one or more parameters detected during the second active scan comprise at least one of a count of detected Access Points (APs), a received signal strength of one or more probe responses, a channel load, a delay time to receive the one or more probe responses, an available air time, a detected number of STAs, or a scan success ratio.

13. The apparatus of claim 1, wherein the selected active scan configuration comprises the first active scan configuration or the second active scan configuration.

14. The apparatus of claim 1 comprising a radio to transmit one or more probe requests and detect one or more probe responses.

15. The apparatus of claim 14 comprising one or more antennas connected to the radio, a memory, and a processor.

16. A product comprising one or more tangible computer-readable non-transitory storage media comprising computer-executable instructions operable to, when executed by at least one processor, enable the at least one processor to cause a wireless communication station (STA) to:
maintain active scan configuration information defining a plurality of active scan configurations corresponding to a respective plurality of predefined environment types, the plurality of active scan configurations comprising at least a first active scan configuration and a second active scan configuration, the first active scan configuration comprising a first setting of at least one of a dwell time, a count of probe requests, or a probe request transmission rate, the second active scan configuration comprising a second setting, different from the first setting, of at least one of the dwell time, the count of probe requests, or the probe request transmission rate;
classify a wireless communication channel as a selected environment type from the plurality of predefined environment types based on scan results of at least one first active scan over the wireless communication channel;
select from the plurality of active scan configurations a selected active scan configuration corresponding to the selected environment type; and
perform at least one second active scan over the wireless communication channel according to the selected active scan configuration corresponding to the selected environment type.

17. The product of claim 16, wherein the plurality of environment types comprises two or more environment types representing two or more respective different counts of Access Points (APs).

18. The product of claim 16, wherein the instructions, when executed, cause the STA to classify the wireless communication channel as the selected environment type based on a count of detected Access Points (APs) over the wireless communication channel.

19. The product of claim 16, wherein the instructions, when executed, cause the STA to classify the wireless communication channel as the selected environment type based on at least one of a detected channel load over the wireless communication channel, a received signal strength of one or more probe responses received over the wireless communication channel, or a detected number of STAs over the wireless communication channel.

20. The product of claim 16, wherein the instructions, when executed, cause the STA to perform the at least one second active scan based on one or more active scan parameters defined by the selected active scan configuration, to determine one or more adjusted active scan parameters based on scan results of the at least one second active scan, and to perform one or more third active scans based on the one or more adjusted active scan parameters.

21. The product of claim 16, wherein the instructions, when executed, cause the STA to dynamically adjust the second active scan based on one or more parameters detected during the second active scan.

22. The product of claim 16, wherein the selected active scan configuration comprises the first active scan configuration or the second active scan configuration.

23. An apparatus of a wireless communication station (STA), the apparatus comprising:
means for maintaining active scan configuration information defining a plurality of active scan configurations corresponding to a respective plurality of predefined environment types, the plurality of active scan configurations comprising at least a first active scan configuration and a second active scan configuration, the first active scan configuration comprising a first setting of at least one of a dwell time, a count of probe requests, or a probe request transmission rate, the second active scan configuration comprising a second setting, different from the first setting, of at least one of the dwell time, the count of probe requests, or the probe request transmission rate;
means for classifying a wireless communication channel as a selected environment type from the plurality of predefined environment types based on scan results of at least one first active scan over the wireless communication channel;
means for selecting from the plurality of active scan configurations a selected active scan configuration corresponding to the selected environment type; and means for performing at least one second active scan over the wireless communication channel according to the selected active scan configuration corresponding to the selected environment type.

24. The apparatus of claim 23 comprising means for performing the at least one second active scan based on one or more active scan parameters defined by the selected active scan configuration, determining one or more adjusted active scan parameters based on scan results of the at least one second active scan, and performing one or more third active scans based on the one or more adjusted active scan parameters.

25. The apparatus of claim 23 comprising means for dynamically adjusting the second active scan based on one or more parameters detected during the second active scan.

* * * * *